United States Patent
Le et al.

(10) Patent No.: US 9,517,384 B2
(45) Date of Patent: Dec. 13, 2016

(54) PUNCHING BAG SYSTEMS, ACCESSORIES AND METHODS

(71) Applicant: AVALE ENTERPRISES PTY LTD, Melbourne (AU)

(72) Inventors: Vu Le, Hawthorn (AU); Abtin Mahdavi, Box Hill (AU)

(73) Assignee: AVALE ENTERPRISES PTY LTD, Melbourne (AU)

( * ) Notice: Subject to any disclaimer, the term of this patent is extended or adjusted under 35 U.S.C. 154(b) by 0 days.

(21) Appl. No.: 14/204,918

(22) Filed: Mar. 11, 2014

(65) Prior Publication Data

US 2014/0364278 A1 Dec. 11, 2014

Related U.S. Application Data

(63) Continuation of application No. PCT/AU2012/001084, filed on Sep. 11, 2012.

(30) Foreign Application Priority Data

Sep. 11, 2011 (AU) ................................. 2011903719

(51) Int. Cl.
*A63B 24/00* (2006.01)
*A63B 69/32* (2006.01)
*G06F 3/01* (2006.01)

(52) U.S. Cl.
CPC ........... *A63B 24/0062* (2013.01); *A63B 69/32* (2013.01); *G06F 3/011* (2013.01); *A63B 2244/10* (2013.01); *A63B 2244/102* (2013.01)

(58) Field of Classification Search
CPC . A63B 24/0062; A63B 69/32; A63B 2244/10; G06F 3/011
USPC .............................................. 482/1–9, 83, 84
See application file for complete search history.

(56) References Cited

U.S. PATENT DOCUMENTS

| 7,909,749 | B2 | 3/2011 | Sheedy | |
| 2005/0266967 | A1* | 12/2005 | Considine et al. | 482/84 |
| 2009/0048069 | A1 | 2/2009 | Sheedy | |
| 2009/0176632 | A1* | 7/2009 | Wiber | 482/84 |
| 2010/0130329 | A1* | 5/2010 | Sullivan et al. | 482/4 |

(Continued)

FOREIGN PATENT DOCUMENTS

WO    WO 2004070336 A1 *    8/2004

OTHER PUBLICATIONS

International Search Report issued in PCT Appl. No. PCT/AU2012/001084.

*Primary Examiner* — Sandhara Ganesan

(74) *Attorney, Agent, or Firm* — Marshall, Gerstein & Borun LLP

(57) ABSTRACT

In one preferred form of the present invention, there is provided a strike measurement system (44) for a punching bag (14). The measurement system (44) includes an accessory (10) for being installed on the punching bag (14). The accessory (10) has a number of sensors (16) for receiving strike data, and a communications facility (42) for use in transmitting strike information to a computing device (50); wherein the system (44) is adapted for utilising an intermediate computing device (46) between the computing device (50) and the communications facility (42). In the system (44) the intermediate computing device (46) configured for assisting with the transmission of the strike information to the computing device (50).

16 Claims, 24 Drawing Sheets

(56) References Cited

U.S. PATENT DOCUMENTS

2010/0184010 A1* 7/2010 Perez .......................... 434/247
2011/0172060 A1  7/2011 Morales et al.
2012/0053016 A1* 3/2012 Williamson .................... 482/8

* cited by examiner

PUNCHING BAG SYSTEMS, ACCESSORIES AND METHODS

FIELD OF THE INVENTION

In preferred forms the present invention relates to punching bag systems, accessories and methods.

BACKGROUND TO THE INVENTION

Punching bags typically comprise an outer shell surrounding a cushioning material for resisting a number of punches during a training session.

Punching bags are typically used in sports involving arm and leg strikes including conventional boxing, kickboxing and various martial arts.

It would be advantageous if the public could be provided with an improved punching bag system, accessory or method, or at least be provided with a useful choice It is against this background and the problems and difficulties associated therewith that the present invention has been developed.

SUMMARY OF THE INVENTION

According to a first aspect of preferred embodiments herein described there is provided a strike measurement system for a punching bag comprising: an accessory for being installed on the punching bag, the accessory having a number of sensors for receiving strike data, and a communications facility for use in transmitting strike information to a computing device; wherein the system is adapted for utilising a intermediate computing device between the computing device and the communications facility, the intermediate computing device for assisting with the transmission of the strike information to the computing device.

Preferably the system is adapted for utilising the intermediate computing device between the computing device and the communications facility for assisting with the transmission of the strike information to the computing device on a relatively consistent basis.

Preferably the strike measurement system includes an application for providing computer instructions for causing the computing device to query the intermediate computing device on a relatively consistent basis.

Preferably computer instructions are provided for causing the computing device to query the smart phone at regular intervals.

According to a second aspect of preferred embodiments herein described there is provided a computer implemented strike measurement method including: providing an accessory; providing a intermediate computing device and a computing device; and querying the intermediate computing device using the computing device to receive strike information transmitted from the accessory; and displaying the strike information on the computing device.

According to a third aspect of preferred embodiments herein described there is provided a computer implemented system comprising: a data access for facility for querying a smart phone to receive strike information transmitted from a communications facility of a punching bag accessory.

According to a fourth aspect of preferred embodiments herein described there is provided an accessory for a punching bag comprising: an accessory body adapted to wrap around the body of the punching bag, the accessory body including a number of sensors to measure the performance of a user with respect to the accessory; the accessory being of a width wherein a single accessory is able to be positioned by a user to be suitable for measuring the performance of selected one from the group comprising leg directed strikes, torso directed strikes and head directed strikes; the user requiring multiple accessories to be positioned on a full length punching bag to concurrently measure the performance of leg, torso and head directed strikes.

Preferably the accessory can be positioned at a lower position on the punching bag to measure and categorise, left, right and central leg strikes.

Preferably the accessory can be positioned at a middle position on the punching bag to measure and categorise left, right and central torso strikes.

Preferably the accessory can be positioned at an upper position on the punching bag to measure and categorise left, right and central head strikes.

Preferably the user requires 3 such accessories to be positioned on a full length punching bag to concurrently measure the performance of leg, torso and head directed strikes.

Preferably the accessory includes a computing device to concurrently measure strike information from at least three accessories.

Preferably the accessory includes three groupings of sensors to respectively measure left, central and right strikes.

Preferably the accessory includes at least two spaced apart fastening portions of length at least one quarter of the circumference of the punching bag.

Preferably the fastening portions comprise Velcro strips of a configuration shown in the drawings attached hereto.

Preferably the accessory includes at least two spaced apart fastening portions of length at least one quarter of the circumference of the punching bag.

Preferably the fastening portions comprise Velcro strips of a configuration shown in the drawings attached hereto.

Preferably a user can assess their performance in their overall, power, speed, accuracy of strikes.

Preferably the accessory includes a number of gripping portions comprised of a special gripping material in the rearward surface of the accessory body for gripping the punching bag when suitably positioned for measuring the performance of one or more strikes.

According to a fifth aspect of preferred embodiments herein described there is provided a computer readable medium having stored thereon computer executable instructions for performing a computer implemented method as per any of the above method aspects.

According to a sixth aspect of preferred embodiments herein described there is provided a computer readable medium having stored thereon computer executable instructions encoding a computer implemented system as per any of the above system aspects.

Preferably the computer-readable medium encoded with one or more facilities configured to run an application configured to carry out a number of operations to provide any one of the preceding method or system claims.

According to a seventh aspect of preferred embodiments herein described there is provided computer implemented exercise system comprising a statistical component having cartesian functionality and radial-type functionality; and a display component for displaying training data using either the cartesian functionality or radial-type functionality.

Preferred embodiments of the present invention preferably provide systems and methods that:

(i) Provide the user with an accessory for a punching bag that can be readily installed in various positions on the punching bag and which allows for multiple accessory installations.

(ii) Provide the user with an accessory for a punching bag that provides advantageous strike data to a computing device selected from the group comprising a personal computer, a smart phone and a tablet.

(iii) Provide for the advantageous updating of a computing device such as a personal computer by using a smart phone as a mule located between the punching accessory and the personal computer.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings, in which.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
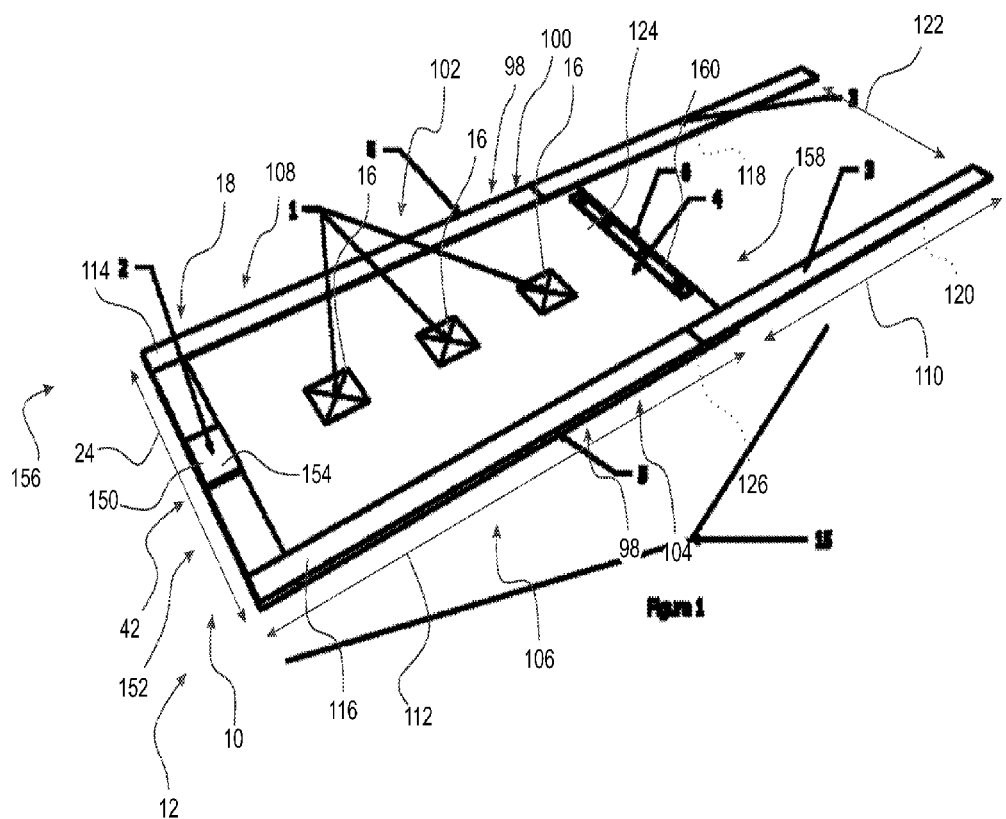
FIG. 1 provides a perspective view of an accessory according to a first preferred embodiment of the present invention.
Figure 2:
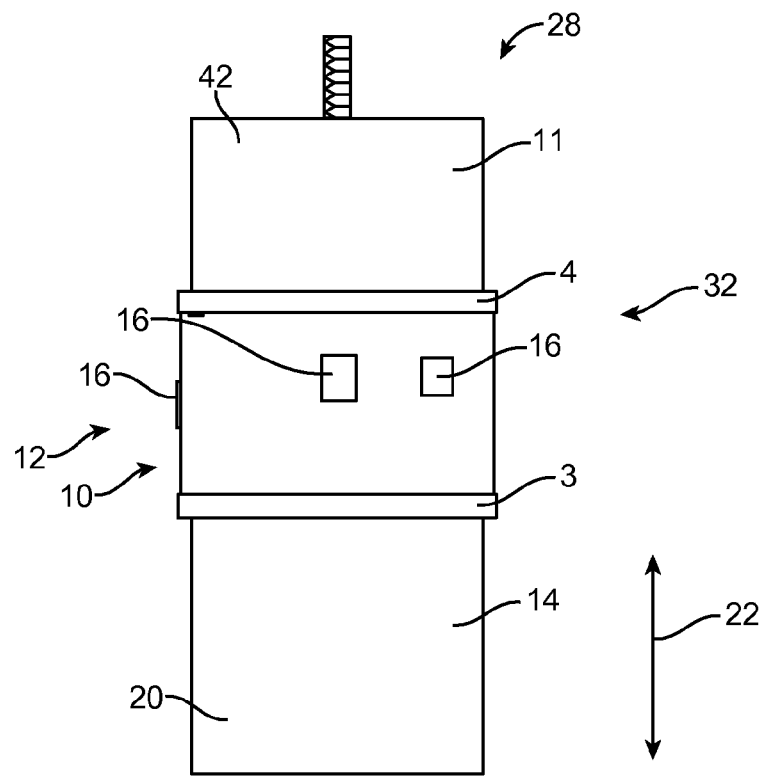
FIG. 2 provides an illustration of the accessory shown in FIG. 1, the accessory being used in a strike measurement system according to a further preferred embodiment of the present invention.
Figure 2:
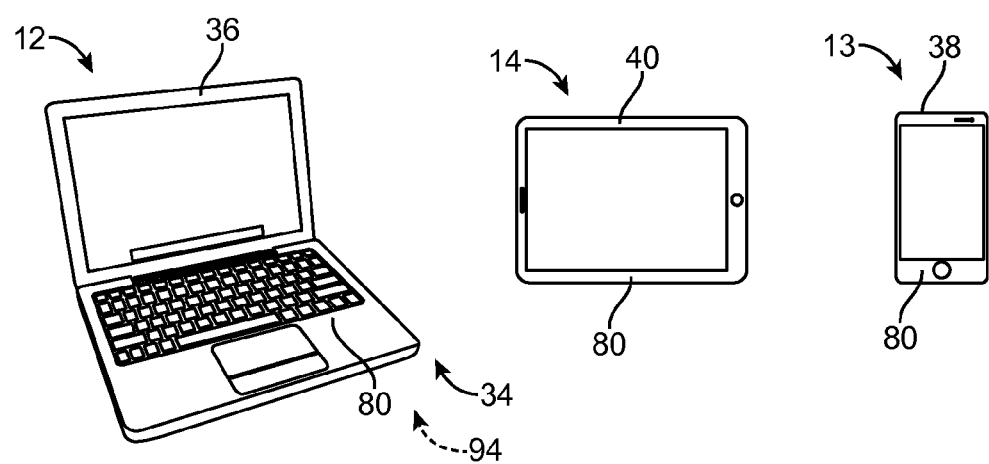

Referring to FIGS. 1 and 2 there is shown a device 10 in the form of an accessory 12 for a punching bag 14. The accessory 12 includes a number of sensors 16 for measuring the performance of a user. The accessory 12 is considered to provide a number advantages relating to the use of the accessory 12 on the punching bag 14.

As shown the accessory 12 comprises an accessory body 18 that is adapted to be wrapped around the body 20 of the punching bag 14. The accessory 12 can be advantageously positioned at various heights 22 to allow the user to focus on leg strikes, torso strikes, and head strikes.

In this regard, the accessory 18 is of a height 24 allowing the accessory 12 to be positioned at various heights 22 on the punching bag 14 suitable for measuring the performance of the user in connection with a selected one of: (i) leg directed strikes; (ii) torso directed strikes and (iii) head directed strikes.

Figure 4:
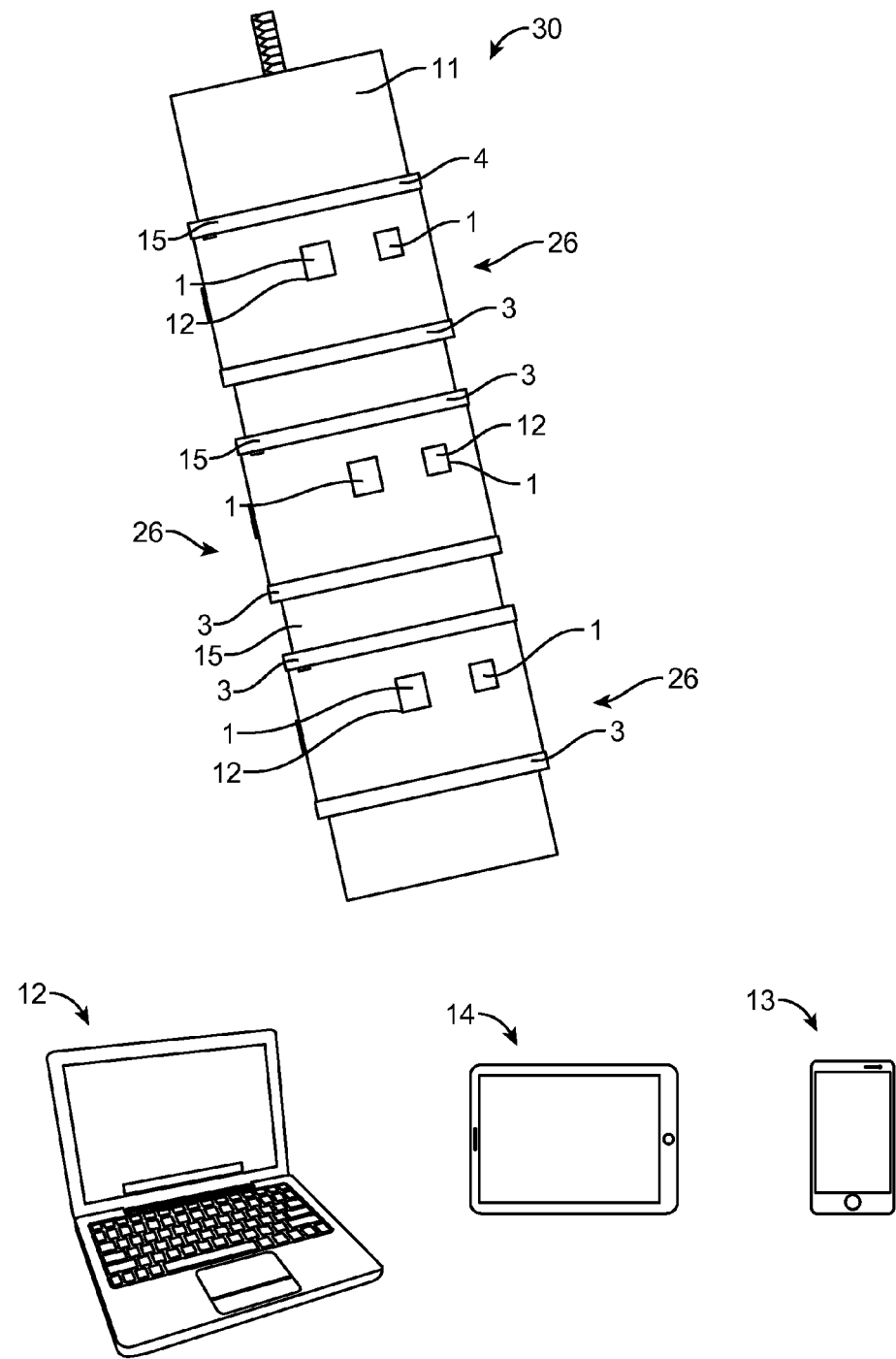
FIG. 4 provides an illustration of the accessory shown in FIG. 1, the accessory being used in a strike measurement system according to a further preferred embodiment of the present invention.

If the user requires his or her performance to be concurrently measured in terms of two or three of: (i) leg directed strikes; (ii) torso directed strikes; and (iii) head directed strikes; then multiple accessories 12 are able to be advantageously used. As shown in FIG. 4, three accessories can be positioned at spaced apart locations 26 on the punching bag 14 as shown in FIG. 4. Multiple accessories 12 can be advantageously connected together to allow the user to measure performance statistics and readily strike the accessories with his or her hands, elbows, knees, feet or legs.

In the case of the arrangement shown in FIG. 2, the accessory 12 forms part of a strike measurement system 28. In the case of arrangement shown in FIG. 4, the accessories 12 form part of a strike measurement system 30.

The strike measurement system 28 includes a measurement arrangement 32 that includes the sensors 16 and a computing device 34. In the embodiment the computing device 14 is selected from the group comprising: a personal computer 36; a smart phone 38; and a tablet 40. The accessory 12 advantageously includes a communications facility 42 having wireless functionality for communicating with the computing device 34.

Figure 5:
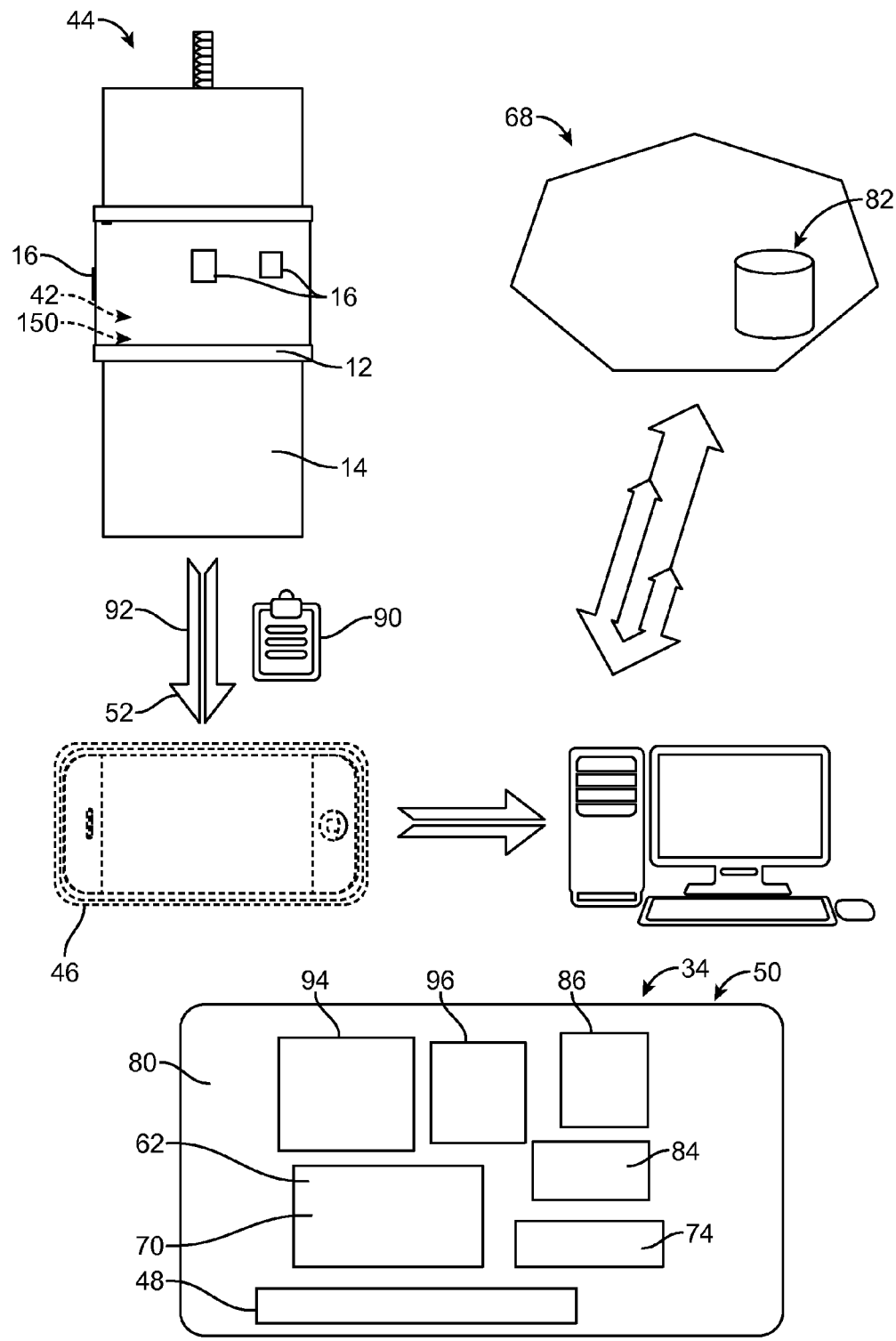
FIG. 5 provides an illustration of a strike measurement system according to yet another embodiment of the present invention.

A further strike measurement system 44 is illustrated in FIG. 5. The strike measurement system 44 includes the accessory 12, and the punching bag 14. The communications facility 42 is adapted to advantageously communicate with a smart phone 46. The smart phone 46 is adapted to update a display 48 on a personal computer 50. The communications facility 42 is advantageously adapted to provide a wireless or bluetooth signal 52. In this embodiment the smart phone 46 is coupled to the personal computer 50 by a USB cable. In other embodiments a wireless channel is provided between the smart phone 46 and the personal computer 50.

Figure 6:
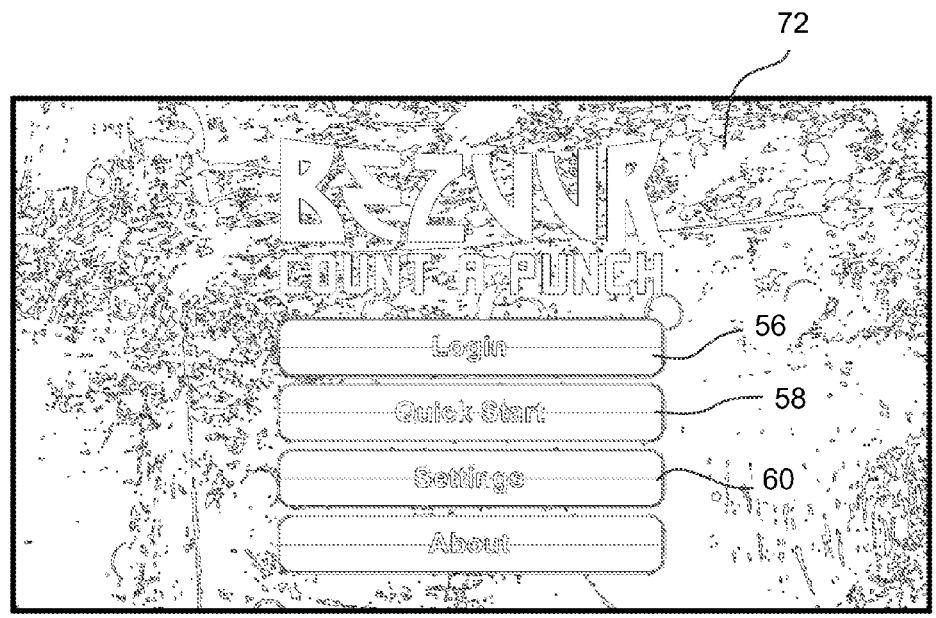
FIGS. 6 to 8 provides several screen layout images provided by the system shown in FIG. 5.
Figure 6:
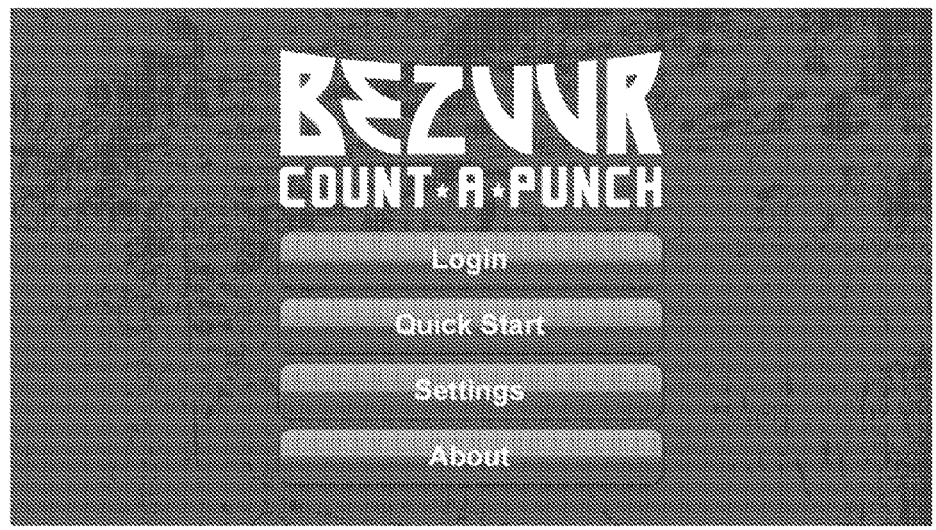
Figure 7:
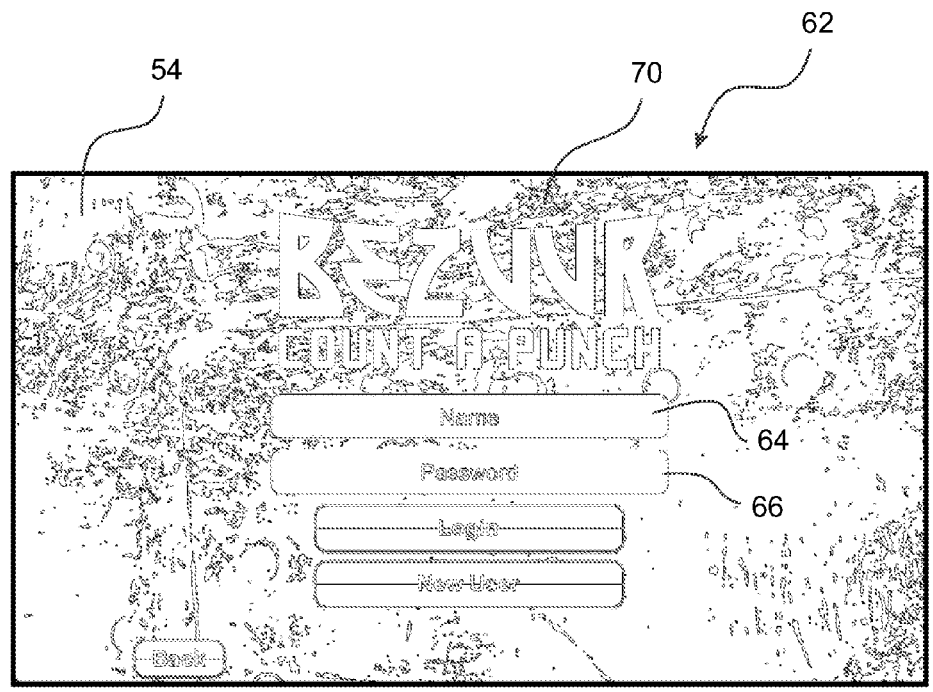
Figure 7:

The personal computer 50 is adapted to present the user with a primary interface 54 shown in FIG. 6. The primary interface 54 includes a login component 56, a quick start component 58 and a settings component 60. The login component 56 forms part of a login facility 62 that advantageously requires a login identifier 64 and a password 66 as shown in FIG. 7. The login facility 62 is able to advantageously connect to a remote system 68 to retrieve login information and is adapted to provide a login interface 70 on the display 48. By communicating between the smart phone 46 and the personal computer 50 the user is advantageously provided a relatively large display 48.

Figure 8:
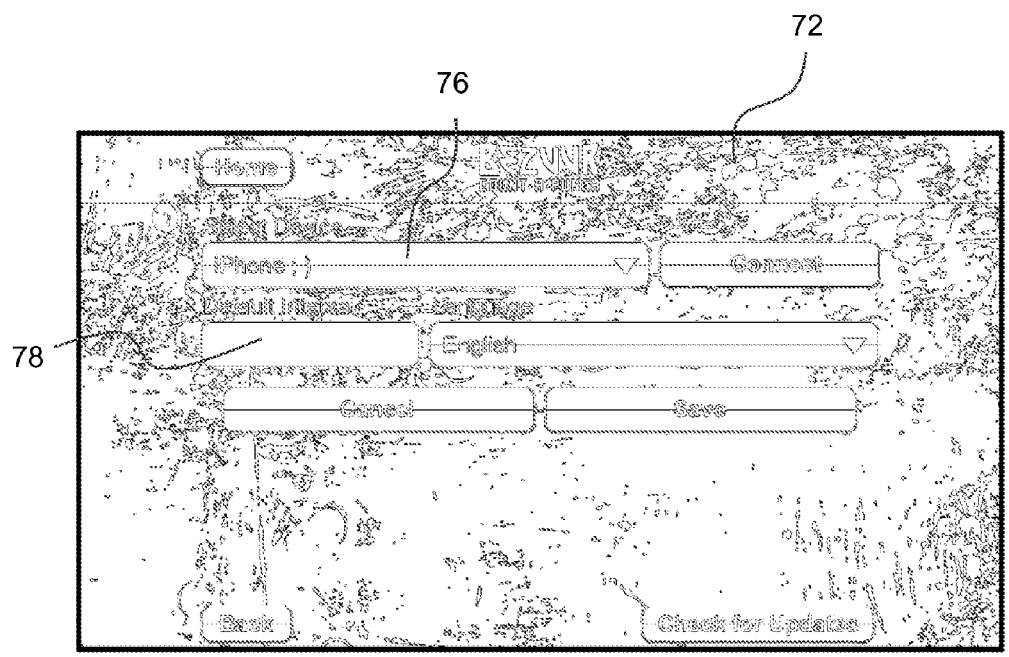
Figure 8:

FIG. 8 illustrates a data access configuration interface 72 provided by a data access facility 74 of the strike measurement system 44. The data access facility, in this embodiment forms part of the personal computer 50. Advantageously using the data access configuration interface 72, the user can select the smart phone 46 using a selector 76, connect to the smart phone 46, and define a data communication interval 78. Advantageously the smart phone 46 is adapted to operate in the system as a mule between the personal computer 50 and the accessory 12. This provides the advantage that the personal computer 50 does not have to be provided with any form of communications dongle requiring separate configuration. Rather a primary application 80 is installed on the personal computer 50 which communicates with the smart phone 46. This is advantageous to the user who is, as a result, able to use the relatively large display 48.

In this embodiment the user's data is stored both locally on the personal computer 50 and in a database structure 82 of the remote system 68. The personal computer 50 is provided with a synchronisation facility 84 for synchronising historical user data stored in a store facility 86 and the database structure 82 of the remote system 68.

Figure 11:
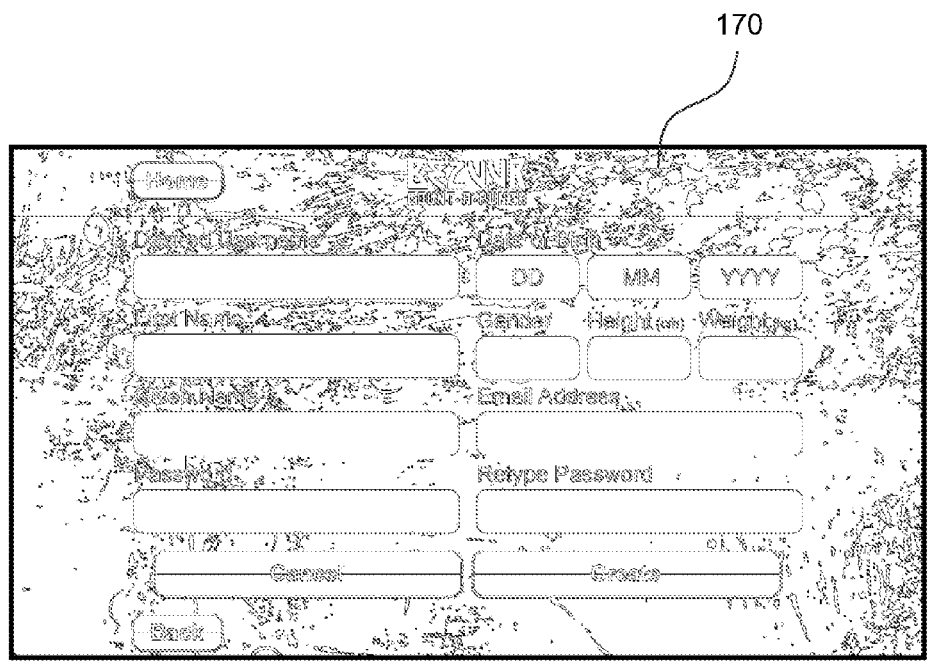
Figure 11:
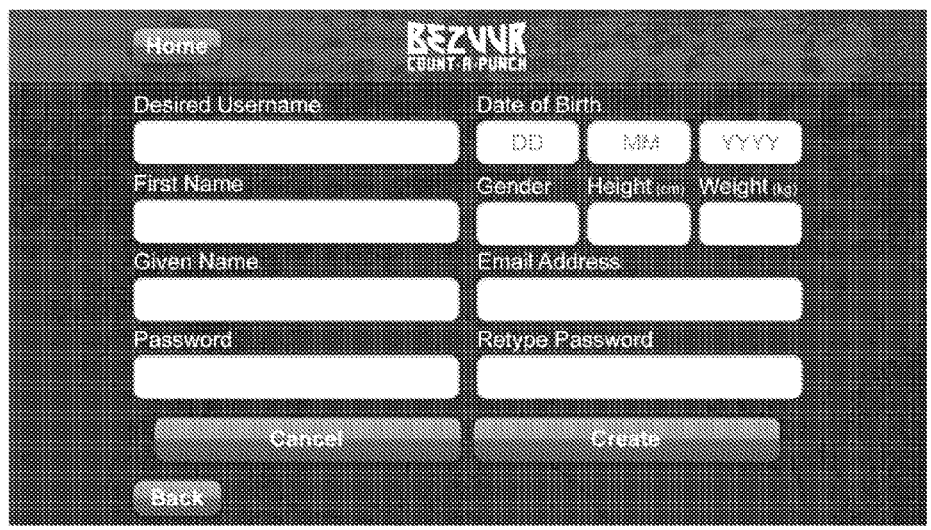
Figure 12:
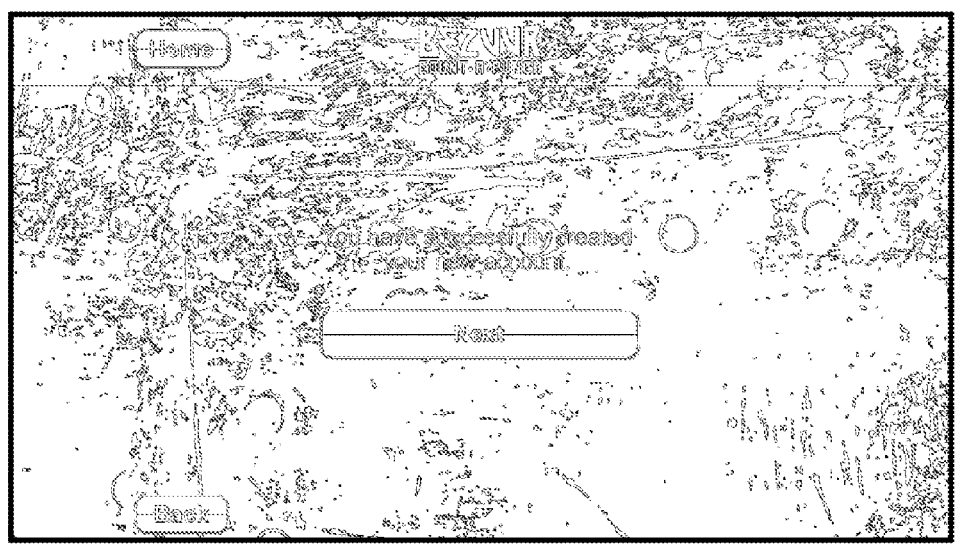
Figure 12:
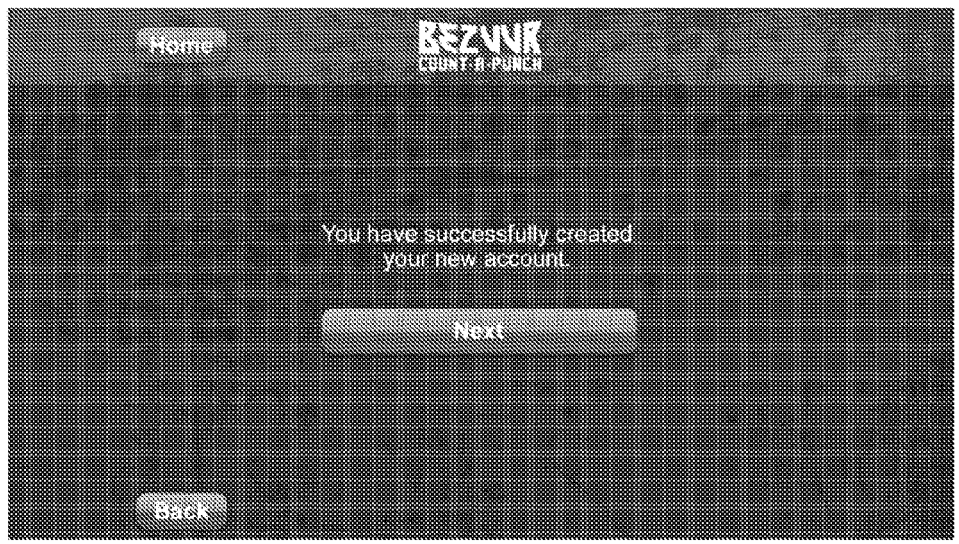
Figure 13:
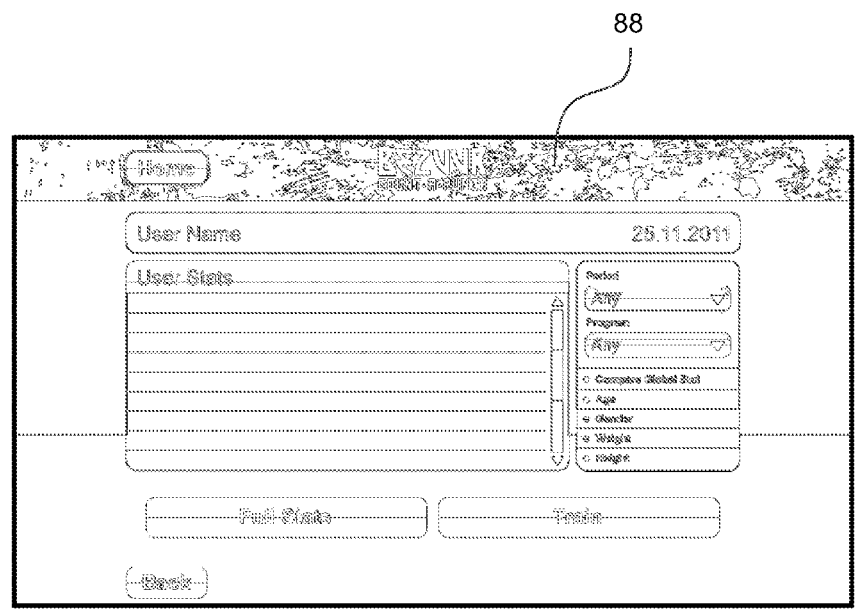
Figure 13:

The user data can be accessed by using the data access facility 74 of the computing device 34. The data access facility 74 is able to provide the user with performance statistics from either the store facility 86 or the remote system 68. A data statistics interface 88 provided by the data access facility 74 is provided in FIG. 11. Advantageously using the computing device 34 all previous performance data can be presented to the user in the form of various tables and graphs. The tables and graphs include average force of punches, the average number of hits during a five minute round and so forth.

The communications facility 42 is adapted to transmit data 90 based on strike force data from the sensors 16 via the wireless channel 92 to a recording facility 94 provided on the personal computer 34, for subsequent visualisation and interpretation on the display 48.

The recording facility 94 receives the strike force data and a processing facility 96 calculates the number of successful and partial hits and their force during a specified time interval or program. The processing facility 96 advantageously calculates the user's average striking speed over a specific time and various other related results.

The sensors 16 of the strike measurement system 44 communicate strike information to the communications facility 42 which then communicates with the smart phone 46. The strike measurement system 44 advantageously allows the user or trainer to monitor the user's performance in terms of: (i) the number of strikes connected; (ii) the force of the strikes; and (iii) the average speed and accuracy.

When using the system, the user aims to accurately strike the marked locations 144 to improve his or her measured performance. Advantageously partially hit sensors only represent a partial amount of the actual force of the strike. The performance is characterised as performance within a specific time period. Performance can also be characterised in terms of a continuous duration until the user terminates the training session.

In order to position the accessory 12, the user wraps the accessory body 18 around the punching bag 14. Fastening portions 98 of the accessory 12 are used to secure the accessory 12 in position. Referring to FIG. 1, a first fastening portion 100 is provided at an upper end 102 of the accessory body 18. A second fastening portion 104 is provided at a lower end 106 of the accessory body 18.

The accessory body 18 is of a rectangular elongated shape 108. Both the fastening portions 100, 104 advantageously extend beyond the accessory body 18 by a distance 110 that is greater than one quarter the length 112 of the accessory body 18 as shown in FIG. 1. The first fastening portion 100 provides a forward facing fastening surface 114 that extends across the upper end 102 of the accessory body 18. The second fastening portion 104 provides a forward facing fastening surface 116 that extends across the lower end 106 of the accessory body 18.

The first fastening portion 100 provides a rearward facing fastening surface 118, as part of the extension away from the accessory body 18. The rearward fastening surface 118 is provided for engaging the forward fastening surface 114. The second fastening portion 104 provides a rearward facing fastening surface 120, as part of the extension away from the accessory body 18. The rearward fastening surface 120 is provided for engaging the forward fastening surface 116. The corresponding surfaces 114, 116, 118 and 120 are provided with mating material such as a hook and loop material.

In this manner, the first fastening portion 100 and the second fastening portion 104 are adapted to advantageously secure the accessory 12 around what is considered to be just about any conventionally sized punching bag. By fastening along the front of the upper end 102 and the front of the lower end 106 an advantageously securing arrangement is provided. A relatively large separation distance 122 is provided between the first and second fastening portions 100 and 104. The separation distance 122 is at least 5/7 of the height 24.

Figure 3:
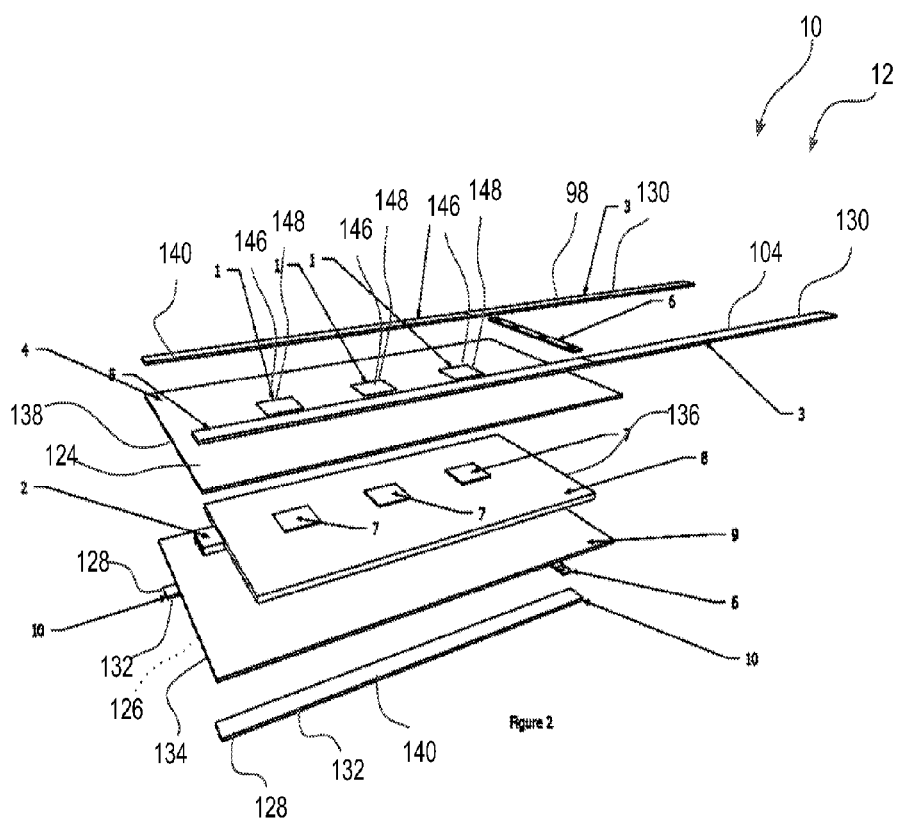
FIG. 3 provides an exploded view of the accessory shown in FIG. 1.

Referring to FIG. 3, the forward facing surface 124 of the accessory body 18 is arranged for cushioning strikes by the user. The rearward facing surface 126 of the accessory body 18 is provided for gripping the outer surface of the punching bag 14.

The rearward facing surface 126 advantageously includes a number of gripping portions 128 for gripping the punching bag 14 when positioned thereon. The gripping portions 128 are positioned underneath the first fastening portion 100 and the second fastening portion 104. This provides an advantageous compressive force to the gripping portions 128 when the fastening portions 98, 104 are fastened around the punching bag 14, due to the first and second portions 100, 104 being relatively tightly wrapped in position.

In this arrangement the first fastening portion 98 and the second fastening portion 104 provide the accessory 12 with two large VELCRO™ straps 130 for fixing the accessory 12 on a just about any punching bag. The gripping portions 128 are provide on the back surface of the accessory 12 below the VELCRO material in the form of at least two rubber or similar type material strips to ensure that the accessory 12 is held in a substantially fixed position during use.

In some embodiments there may be more than 2 or less than 2 Velcro straps depending on the model of the device. On some there might be a fastening belt as well.

Referring to FIG. 3 it can be seen that the accessory comprises: (i) gripping portions 128 that are provided in the form of two strips 132 for gripping engagement with the punching bag 14;(ii) a rearward backing layer 134; (iii) an intermediate layer 136; (iv) a front layer 138; and (v) two fastening strips 140.

The fastening strips 140 form a wrapping member as a hook-and-loop fastener, such as fasteners sold under the trade mark VELCRO. The loop or hook portion of the fastening strips 140 are wrapped around and secured to the front surface of the accessory 12, to a complementary hook or loop portion. The backing layer 134 includes friction members in the form of the gripping members 128 for reducing movement of the device during workouts. The gripping members 128 are placed in two separated locations on the rearward backing layer 134. In other embodiments the friction members may form the entire back surface.

The intermediate layer 136 provides the sensors 16 at various locations. In this embodiment three spaced apart sensors 16 are provided along the longitudinal axis of the accessory 12. This allows for central, left and right strikes. The sensors 16 comprise flat flexible force sensors 142 at marked locations 144 to measure strike force data.

The front of the accessory provides a striking surface including a number of markings 146, indicative of a number of optimum striking regions 148. The markings 146 advantageously allow the user to focus targeting their striking and accuracy. The optimum striking regions 148 are marked on the striking surface 182.

The number and size of the markings 146 can be varied based on desirable requirements and different models of accessories produced. The variations allow for advantageous tailoring of accessories such that they have different striking sizes and patterns to satisfy the end user. As would be apparent, the backing layer 134 and the sensors 16 are not visible to the user during use, as they are covered with an aesthetically pleasing and a suitably durable front layer 138.

The communications facility 42 is adapted to communicate with any computing device 34 selected from the group comprising a personal computer 36, a smart phone 38 and a tablet 40. The communications facility 42 is battery operated by a battery facility 150. The communications facility 42 is adapted to operate wirelessly. The battery facility 150 is rechargeable. When being recharged a wired connection is preferably used to connect the battery to a power source.

Referring to FIG. 1, the communications facility 42 is provided in the form of a transmitter unit 152 for the sensors 16. The transmitter unit 152 is located in a small pouch 154 at an end 156 of the accessory 12. At the other end 158 of the accessory there is a provided a security screw strip 160 that assists with locking in the backing and sensors in the device securely.

Figure 9:
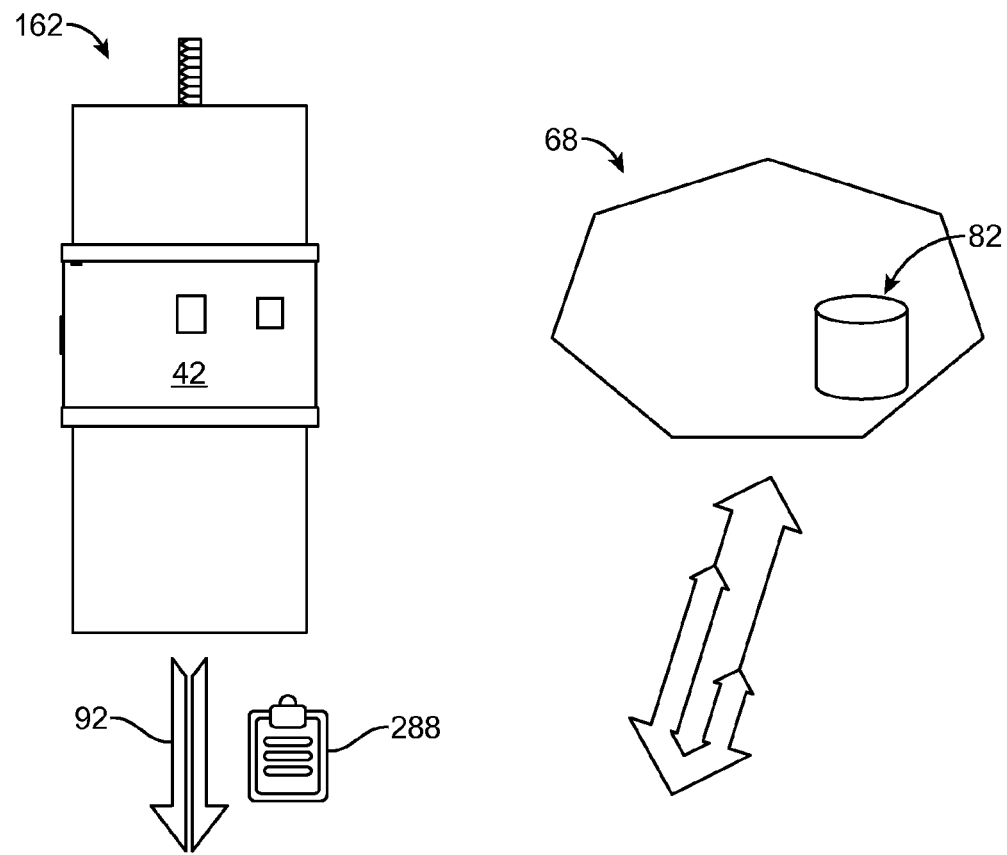
FIG. 9 provides a schematic view of another system according to a preferred embodiment.
Figure 9:
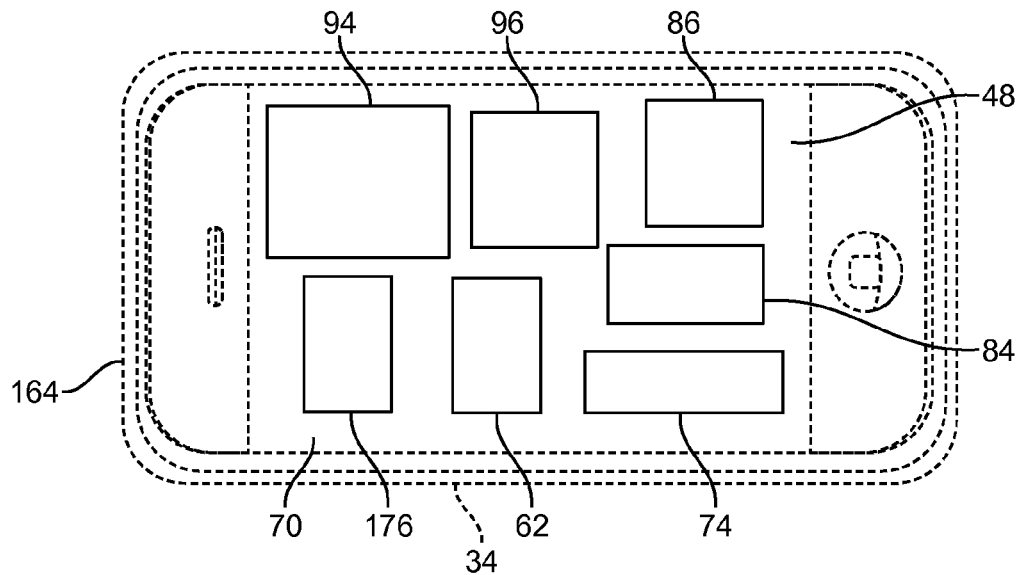
Figure 10:
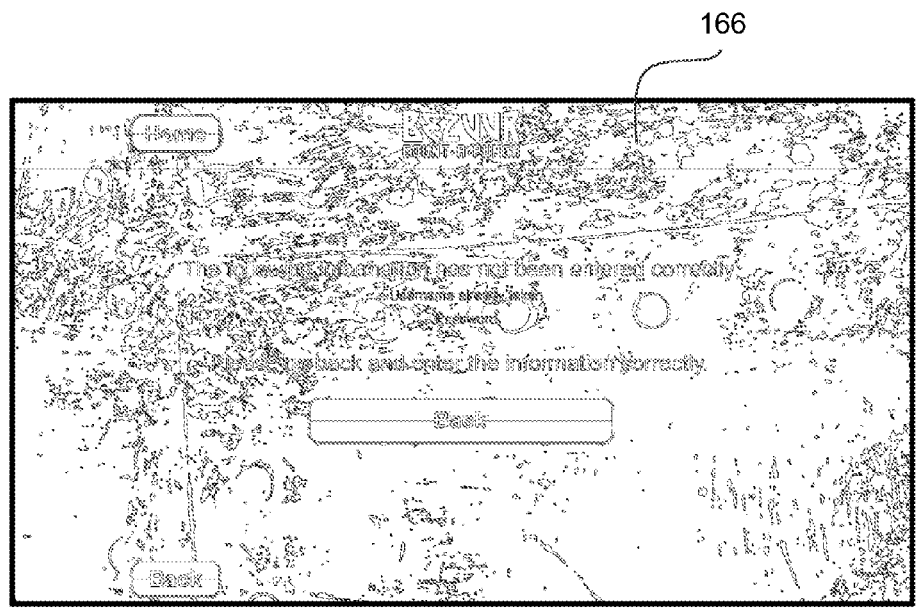
FIGS. 10 to 17 provide several screen layout images provided by the system shown in FIG. 9.
Figure 10:
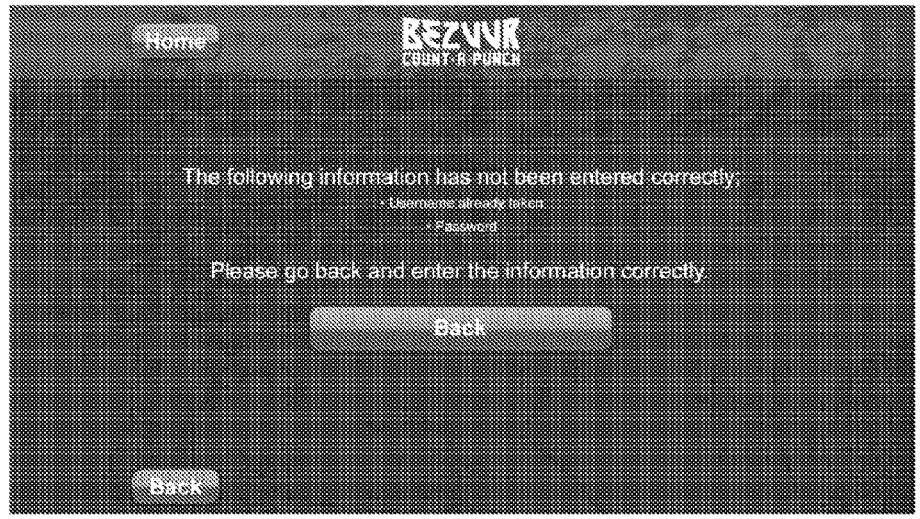

FIG. 9 illustrates a further strike measurement system 162 according to another preferred embodiment of the present invention. The computing device 34 comprises a smart phone 164. The smart phone 164 is adapted to provide the primary interface 54. The smart phone 164 provides a similar function to the personal computer 50. In the Figures similar numerals are used to indicate similar parts and facilities.

As such the smart phone 164 includes an application 80 providing a recording facility 94, a processing facility 96, a store facility 86, a synchronisation facility 84, a data access facility 74 and a login facility 62. The smart phone 164 is adapted to communicate with a remote system 68.

The remote system 68 comprises a database structure 82 containing login details, user program details, and historical data. The login facility 62 communicates with the remote system 68 to verify that supplied login details correspond with an existing user. If this is not the case then an error message 166 is displayed to the user (on the display 48) and the user is directed back to the login interface 70.

The user is then able to re-enter his or her login details or create a new account by activating a new account component 168. Activation of the new account component that provides a new user interface 170 shown in FIG. 11. On the new user interface 170 the user is asked to supply the user specific information as shown. The login system then stores the login information locally and communicates with the remote system 68 to advise of the login time and date. As would apparent, various possible embodiments do note include a remote system 68 and store data only locally.

Once the user has been authorised by the login facility 62 on the smart phone 164, the user is able to verify that the smart phone 164, is in communication with the sensors 16 provided in the accessory 12.

Advantageously using the smart phone 164 all previous performance data can be presented to the user via a data interface 88, in the form of various tables and graphs. The tables and graphs include average force of punches, the average number of hits during a five minute round and so forth.

Figure 14:
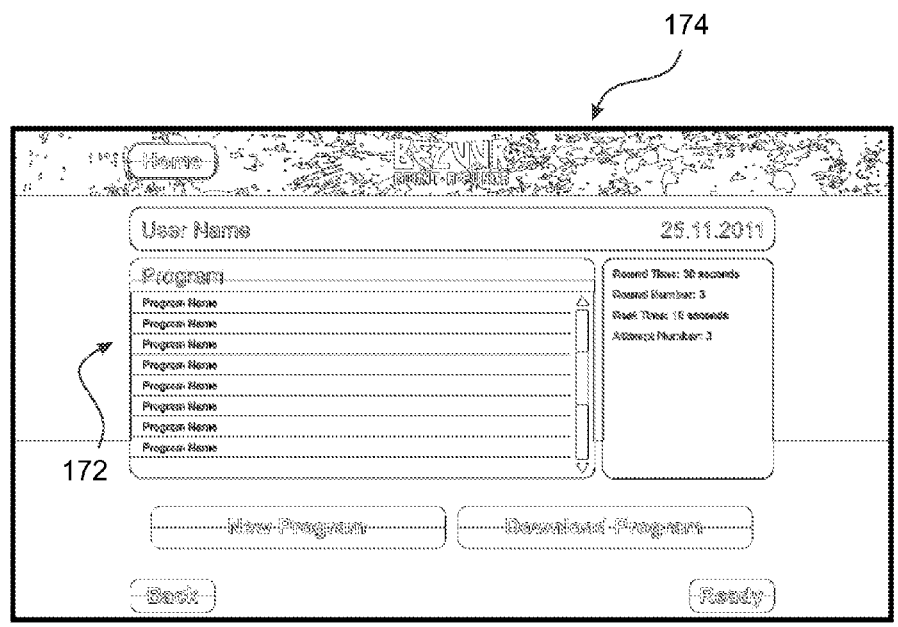
Figure 14:
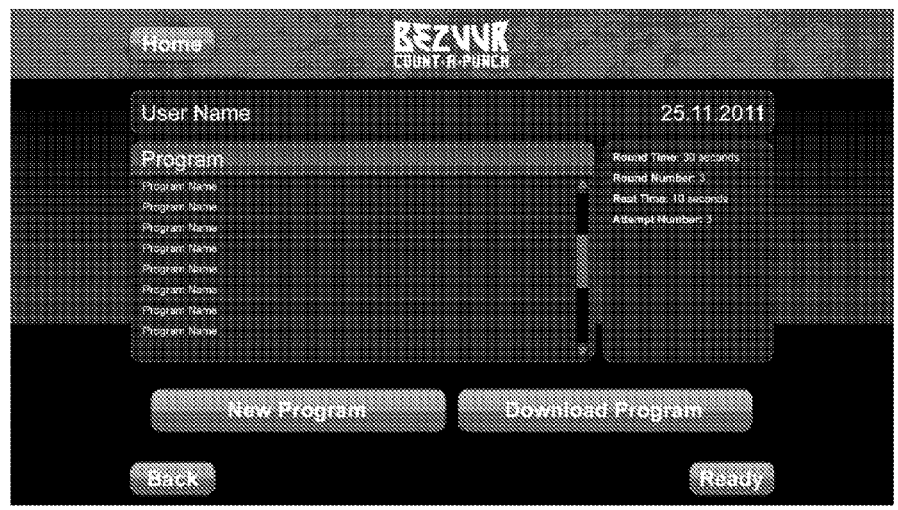

In addition to the performance statistics the smart phone 164 provides the user with access to their progress in specific programs 172 as highlighted in FIG. 14. These programs are displayed with use of the data access facility 74 by a program interface 174. The programs 172 are advantageously able to be manually configured by the user or may be preinstalled or downloaded. The ability to download programs from the remote server 68 using a download facility 176 is considered to be advantageous. The programs 172 can be configured to target specific purposes for the user such as but not limited to conditioning, strength, speed or a combination of these. The advantageous nature of such a combination of measuring statistics as presented to the user is discussed in further detail below.

Figure 15:
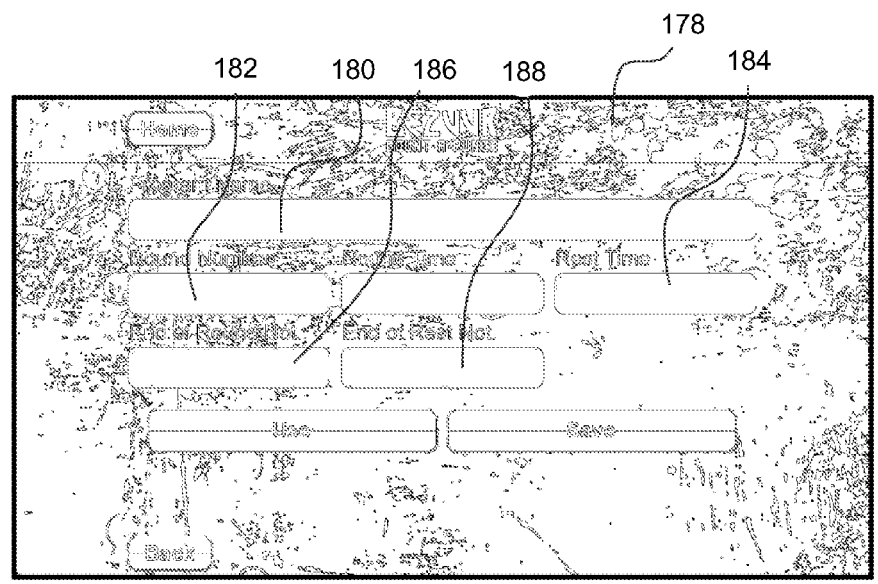
Figure 15:
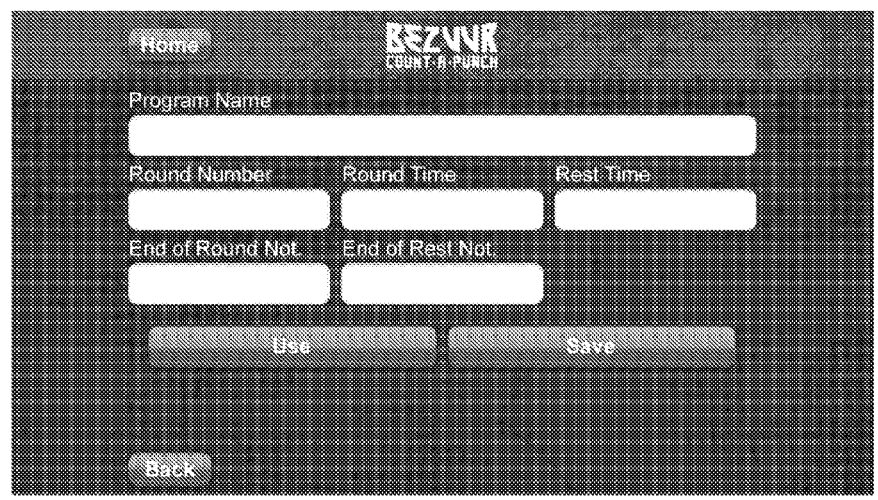

In the embodiment, a program configuration interface 178 provided by the system is shown in FIG. 15. The program configuration interface 178 provides a name component 180, a round number component 182, a round time component 183, a rest time component 184, an end of round component 186, and an end of rest component 188. The predetermined time interval durations set by the components 182 to 188, are considered to advantageously allow for standardisation of an individual's training program and to allow for improvement in the individual's performance to be monitored. The durations can be manually or automatically set to allow the user to tailor desirable exercise routines based on the individual's requirements. The rest time in between rounds and the end of round notification can be visual and/or sound related and end of rest period notification can also be visual and/or sound related.

Figure 16:
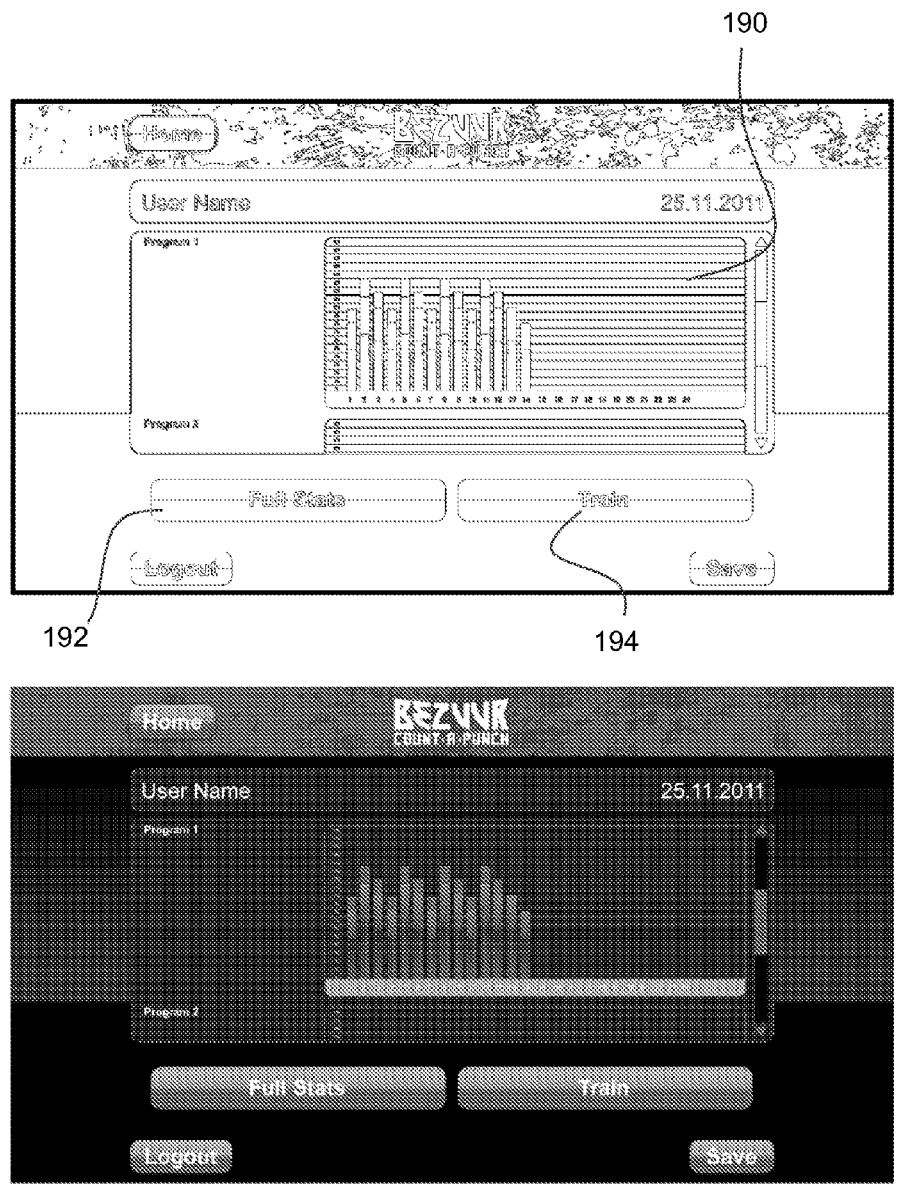

As shown in FIG. 16, the smart phone 164/computing device 34 is further adapted to provide a historical view component 190, a statistics component 192 and a training component 194. Activating the training component 194 allows for free training of the user where average hits and strike forces are shown. More particularly once the user begins their training session three individual graphs are used to display their current, most recent and best performance for that particular program. On their display they will also have how much time is left for that interval, how many intervals they have left and any other associated data pertaining to that specific program.

Figure 17:
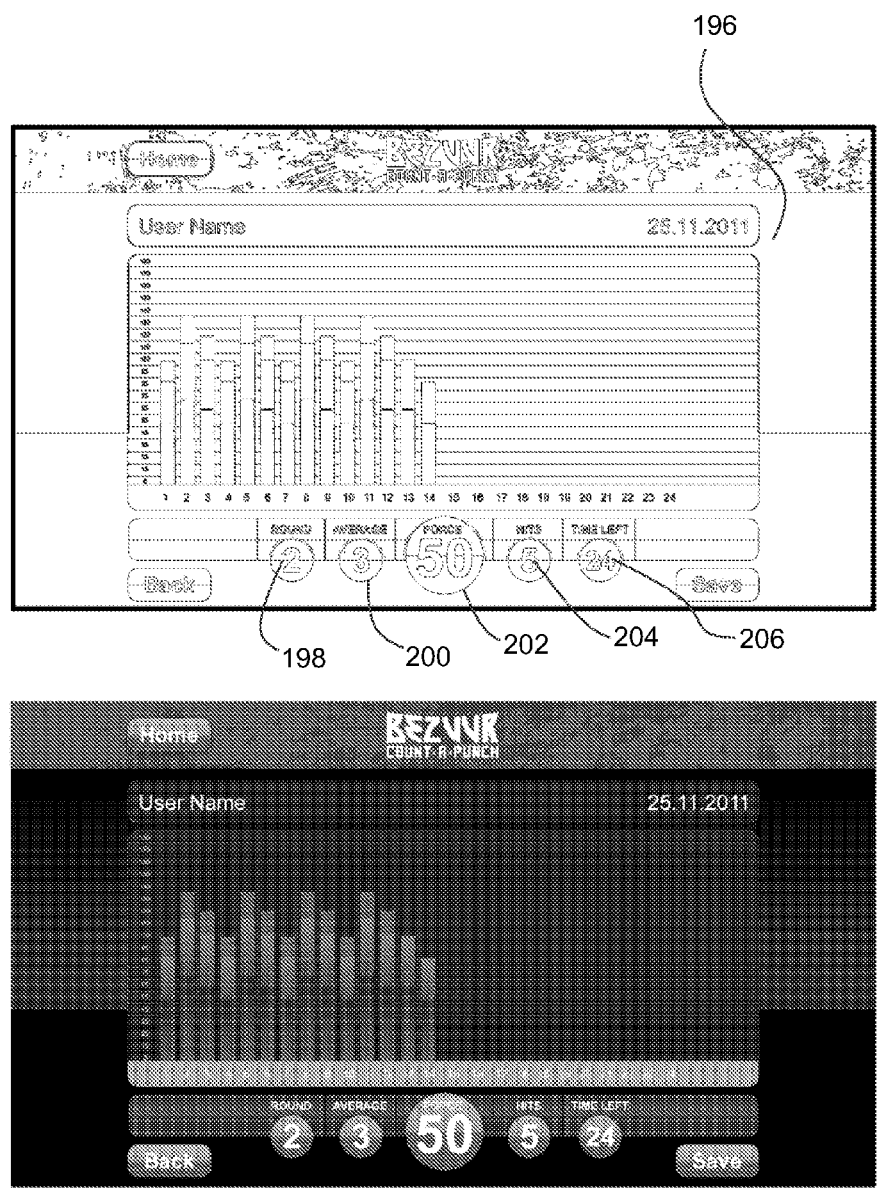

It is also possible to run a program that causes the computing device 34 to display a round interface 196 shown in FIG. 17. The round interface displays the round number 198, an average 200, a force average 202, a hits average 204, and the time 206 remaining in the round.

Figure 18:
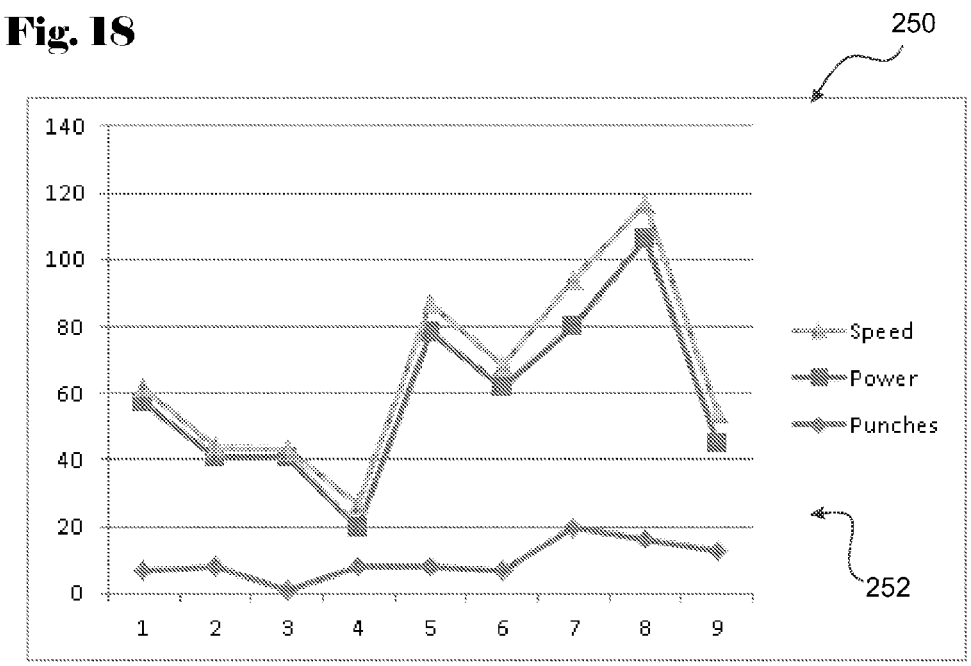
FIGS. 18 to 23 show various display features of the system.
Figure 19:
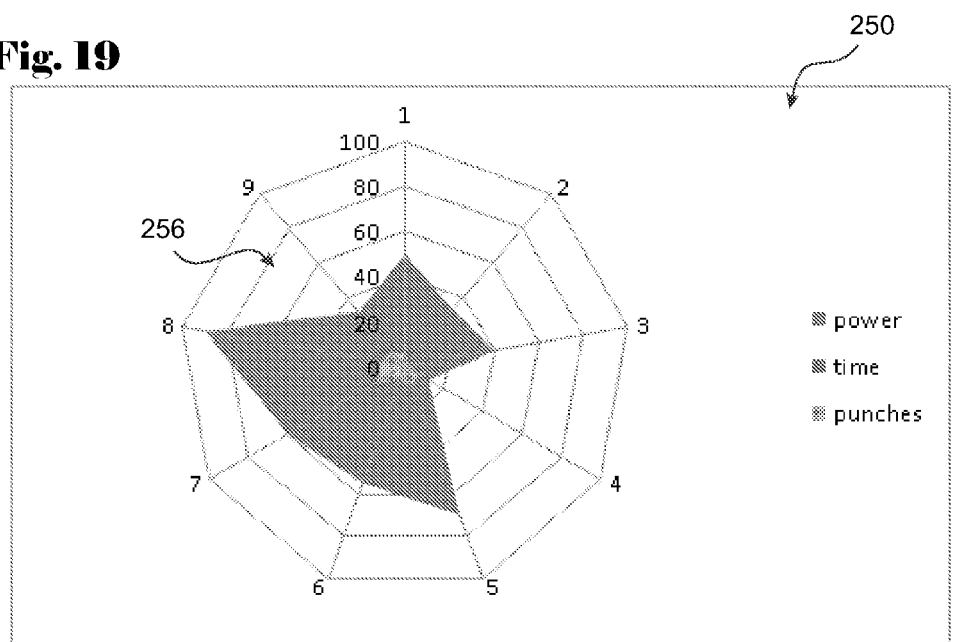

Referring to FIGS. 18 and 19 there is shown an advantageous chart system 250 provided by the system. The chart system 250 illustrates speed, power and punches over time with respect to a specific individual. Advantageously the interface 196 provides an option for transforming a cartesian speed power punch display 252 to provide a radial-type display 254. The radial type display 254 provides a visual indication of the performance of the person using the system.

As shown there are three areas 256 wherein each boundary thereof illustrates performance. By visualising performance the operator can alter his or her training. Various transforms can be applied to the data gathered and displayed by the chart 252 and the chart 254. The feedback provided to the operator is considered to be advantageous.

Figure 20:
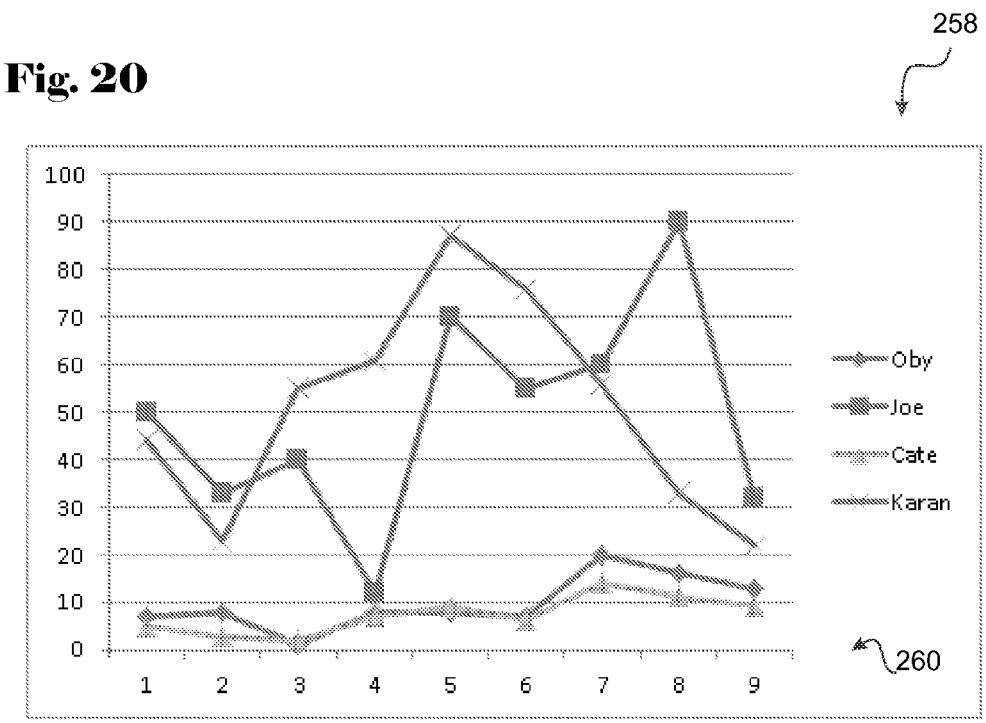
Figure 21:
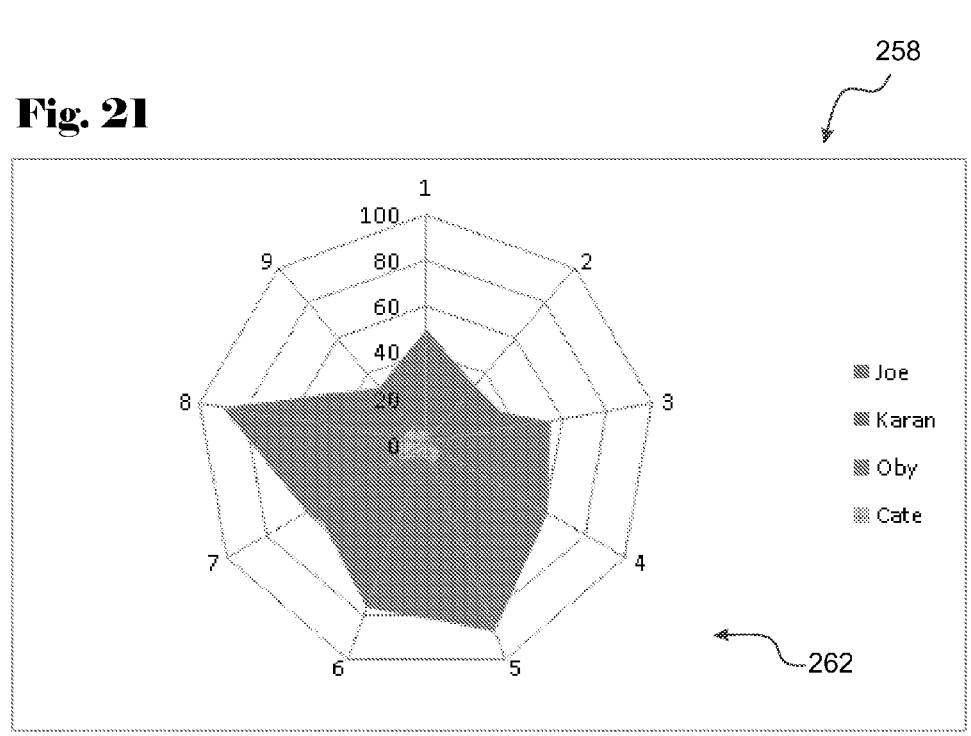

FIGS. 20 and 21 show an advantageous chart system 258 provide by a multiplayer component of the system. The multiplayer component provides an option allowing the display a line type chart 20 or a radial chart 262. By providing a radial chart where time is wrapped in position it is readily possible to compare the performance of each multiplayer in the multiplayer game. Various transparency area colours are preferably used.

Figure 22:
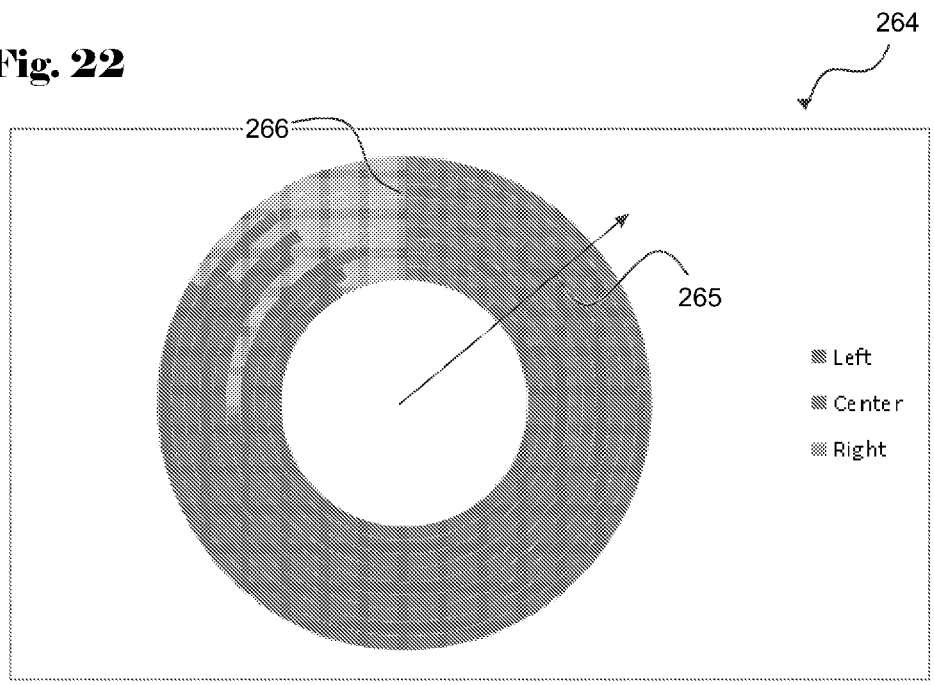
Figure 23:
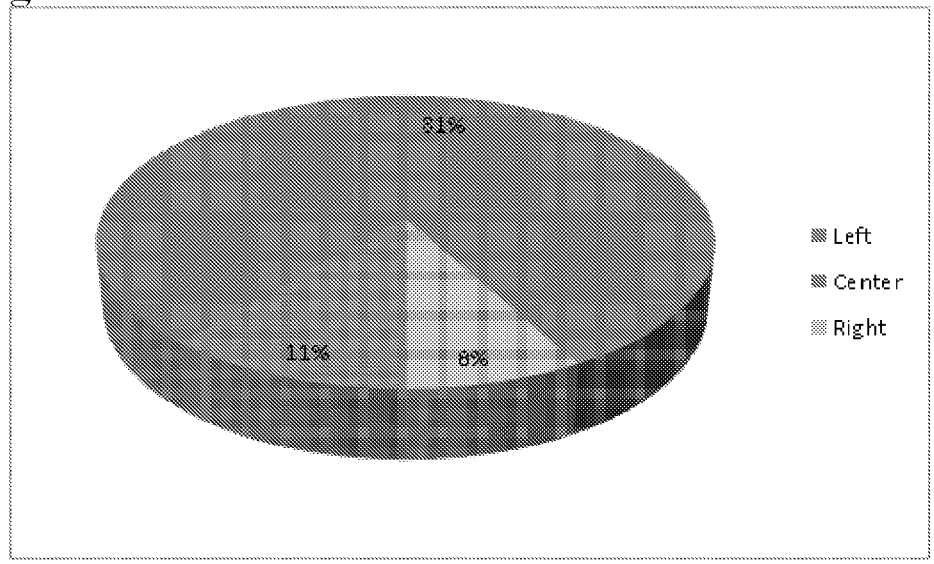

FIG. 22 shows an advantageous system 264 in which the direction of punches is presented to user. This information is gathered by the system. The system advantageously layers percentage type charts in a radial direction over time. Percentages of left, centre and right punches are shown over time. Various percentages are shown for a slice of time in FIG. 23.

More particularly the percentages of left, right and centre directed punches are advantageously displayed with time increasing in the radial direction 265 (and looping over time). Left and right punches oppose one another along a line 266.

Whilst the systems described are preferably dynamic during training and are also used various historical statistic pages. Each user statistics page will have various factors that the user can select to specify how they would like to compare their results. Individual categories are provided including speed, power, stamina and so forth. The process will be the same where users select which factors they would like to compare their results against; this includes people in certain age groups, sex, weight, height, geographical location and so forth or a specific individual.

Figure 24:
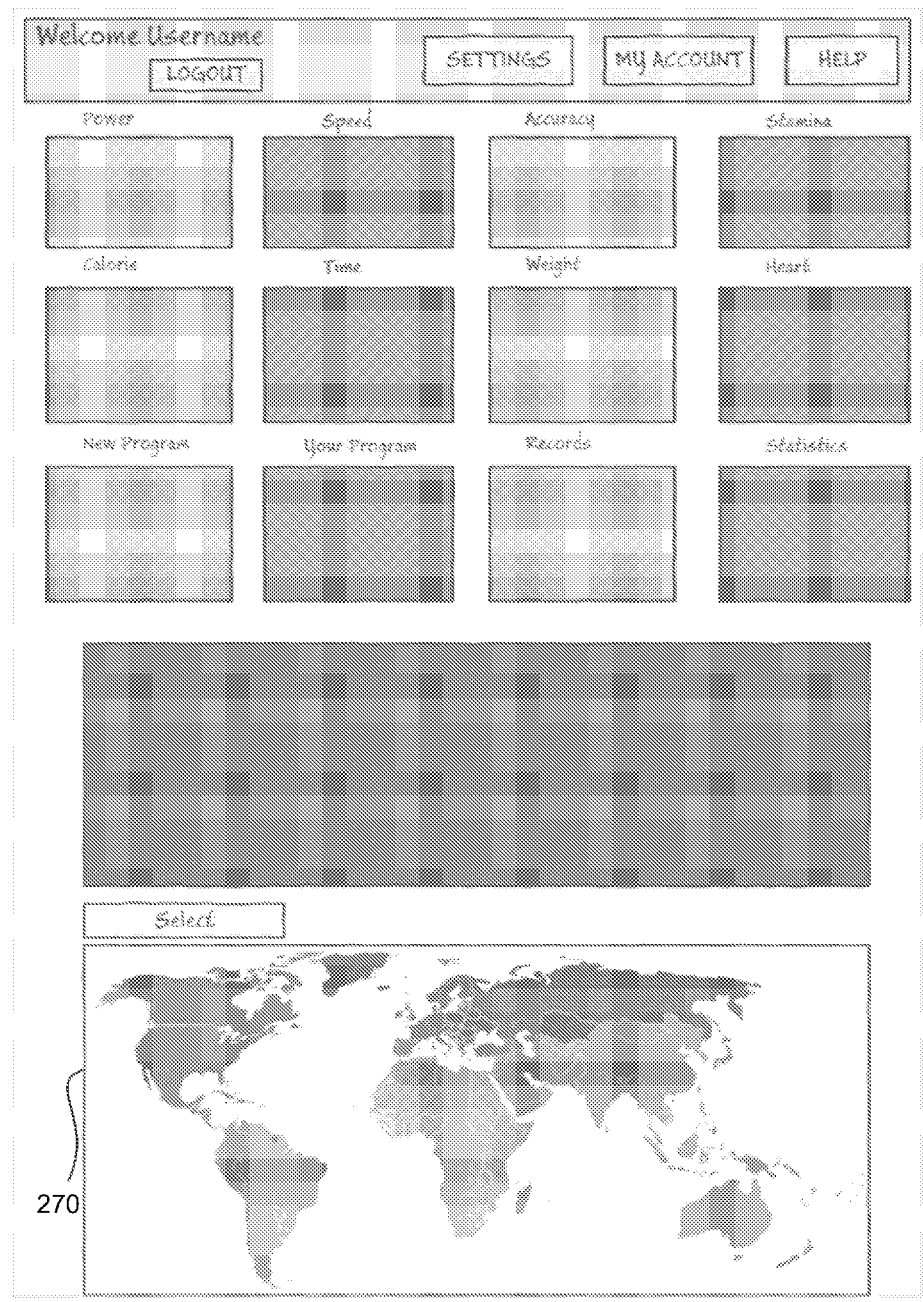
FIGS. 24 and 25 show two interfaces that may form part of the system.

FIG. 24 illustrates an interface 268 of the system. The interface 268 advantageously provides general performance data. Data based on geographical location of other players is advantageously shown in a map component 270. The map component 270 allows users to focus in on the performance of members in particular regions, in particular, a country, state, city and a fine location basis. As would be apparent the system allows for multiplayer training and competition with globally distributed players.

Once the user has logged in, his or her homepage will display multiple widgets with a number providing specific feedback about a particular aspect of heir or her work out i.e. heart rate, speed, power, accuracy, stamina and so forth. As shown several widgets are provided below allowing the user to add new programs, check the statistics on their current programs any trophies that they might have attained or compare their results against friends, specific people or groups such as in their own age group, weight, gender, location and so forth. As the amount of users builds up the comparison factors will also increase and provide users with an even more in depth analysis of their performance.

The middle section of the user's homepage has customized comparative results against their friends or groups. Popular updates and programs. The system also accommodates the display of results of someone they are following e.g. Manny Pacquiao.

The comparisons provided are based on predetermined criteria. The number of rounds, length of the rounds, rest time and various other factors will differ. Various parameter based algorithms are used to determine comparative statistics.

Figure 25:
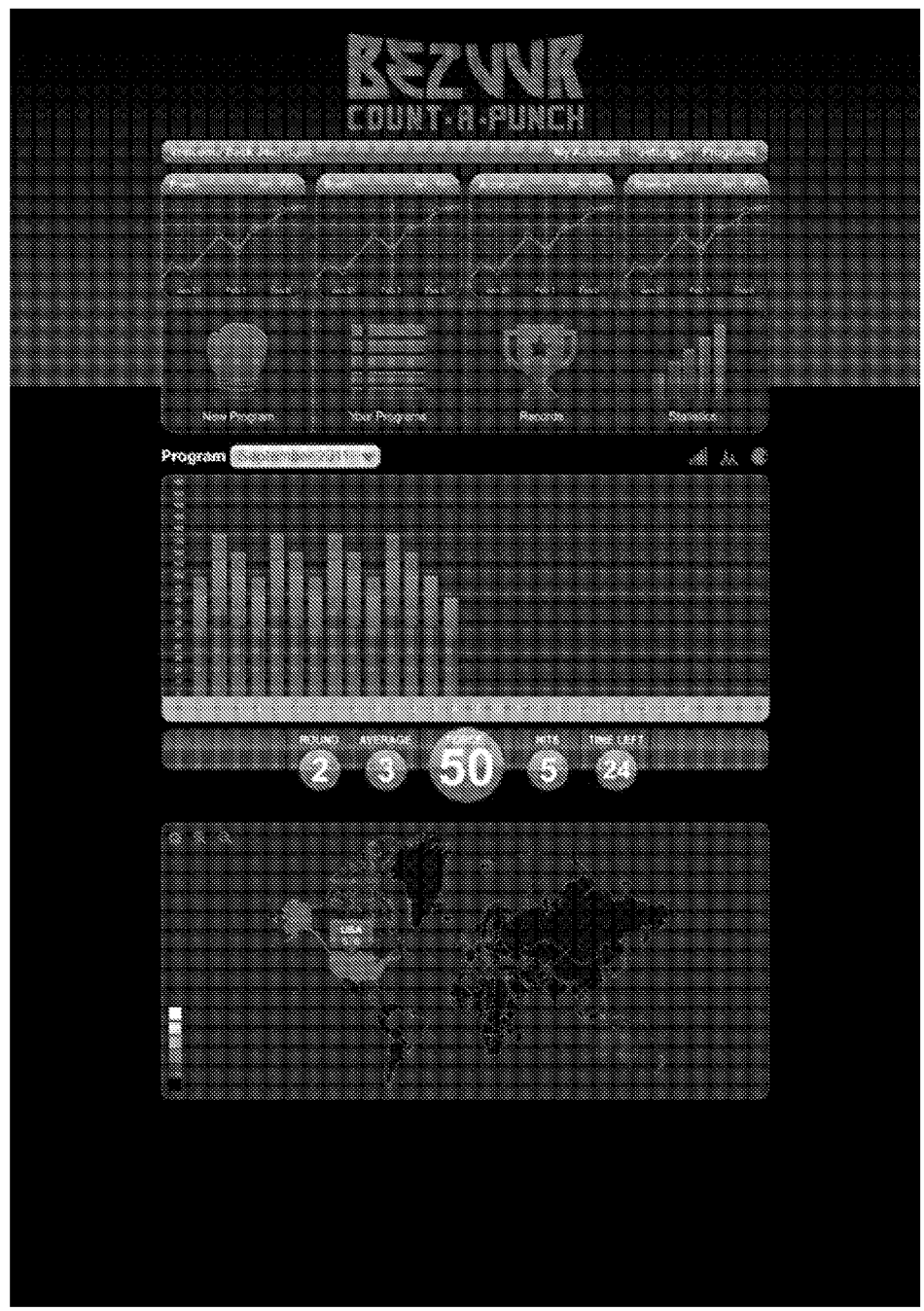

The map component 270 can be used to focus on a global, national, state, city or gym basis, where the user can have a rating based on the comparison with others in the specified territory. The user is accordingly provided with specific and customized feedback that represents the user's ultimate achievement goals. FIG. 25 illustrates a similar user interface.

Advantageously users can assess their performance in their overall, power, speed, accuracy of strikes as well as their stamina, fitness and recovery Returning to the accessory 12, it will be apparent that the accessory utilises a number of VELCRO straps that are attached at the top and bottom of the accessory. The loop or hook portion of the straps is advantageously wrapped around and secured to the front surface of the accessory to a complementary hook or loop portion. The middle layer of the accessory 12 includes the sensors 16 fixed onto the backing 134 and connected to the transmitter device 152. The bottom surface of the backing layer 134 has attached to it resistive strips.

The accessory 12 can be connected to a display and data storage medium and is wrapped around just about any boxing bag 14. The device is connected to the user's compatible input medium. The user can strike the accessory 12 attempting to connect with the marked areas as accurately as possible. The accessory 12 provides sensors at the centre and both left and right side of the boxing bag for the user to strike at. Multiple devices can be advantageously connected to any several and data storage mediums include a portable computer, tablet and mobile phone. Mule device arrangements illustrate a more comprehensive method of feedback for the user. The multiple devices allow for high, mid and low level strikes providing the user with substantially total body workouts.

The various programmed computing devices and applications are considered to provide measurement systems in their own right. As would be apparent programs are for use by a user that connects to the device according to the other aspects aspect of the invention. Various display interfaces can be displayed and operated on a number of input mediums such as a computer, smart phone, tablet or any other similar medium. The input medium will show the users previously recorded statistics and use computation to further enhance the relevant feedback to the user.

Figure 26:
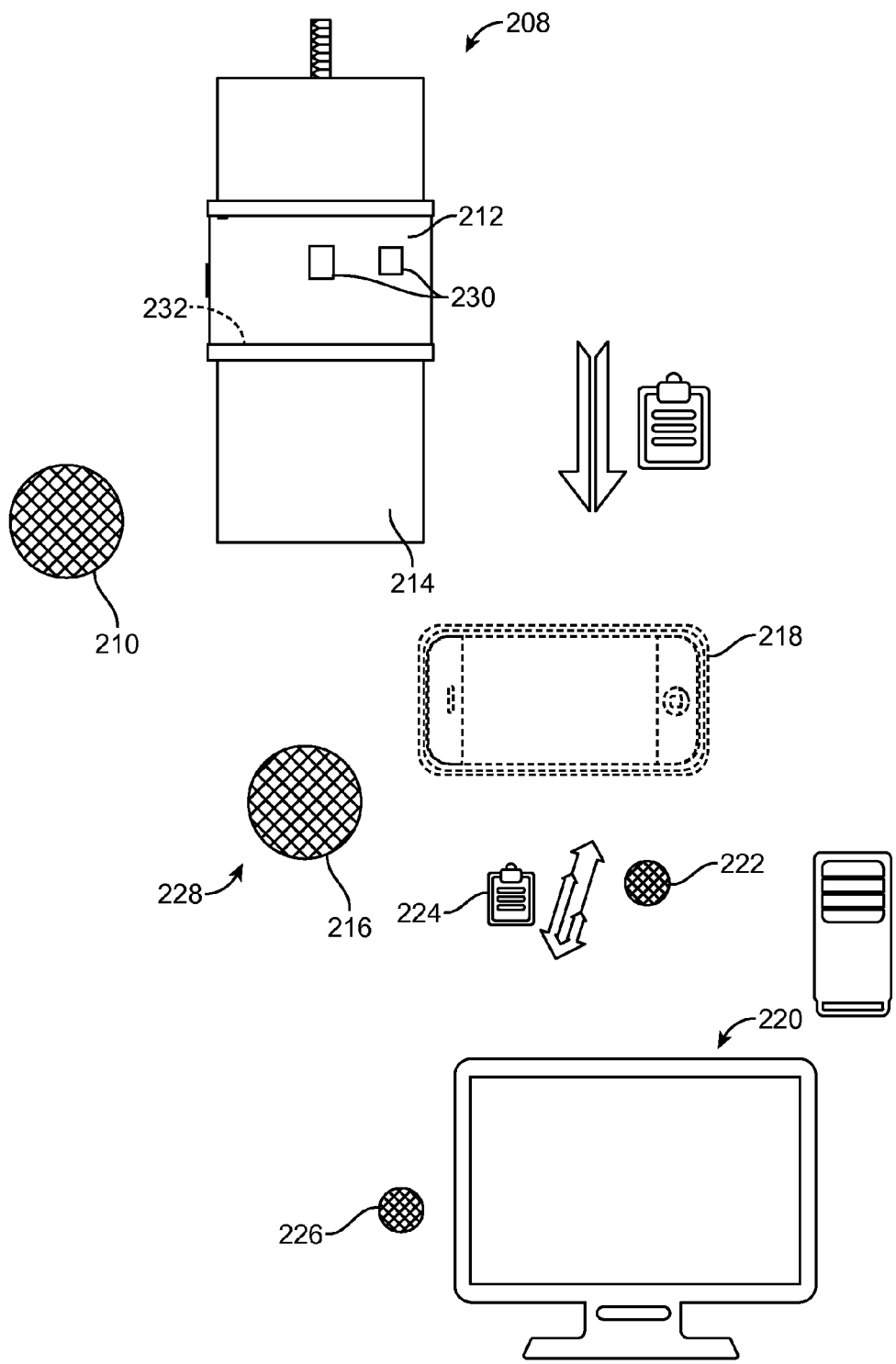
FIG. 26 provides a schematic view of a method according to another preferred embodiment of the present invention.

Referring to FIG. 26, there is shown a computer implemented strike measurement method 208 according to a further preferred embodiment of the present invention. At block 210 the method includes providing an accessory 212 for a punching bag 214. At block 216 the method 208 includes providing an intermediate computing device 218 and a computing device 220. At block 222 the method 208 includes querying the intermediate computing device 218 using the computing device 220. As a result the computing device 220 receives strike information 224 transmitted from the accessory; 10. The strike information is processed and displayed on the computing device 220 at block 226 of the method 208.

The method provides a strike measurement system 228 for the punching bag 214. The system 22 comprises the accessory 212 for being installed on the punching bag 214. A number of sensors 230 are provided for receiving strike data. A communications facility 232 is provided for use in transmitting strike information (strike data) to the computing device 220. The system 228 is accordingly configured for utilising the intermediate computing device 218 between the computing device 220 and the communications facility 232. In the method 208, the intermediate computing device 218 assists with the transmission of the strike information to the computing device 220. More particularly the intermediate computing device 220 provides the strike information on a relatively consistent basis. In the embodiment the information is provided on a sufficient regular basis for the user to be aware of his performance on a reasonably substantially real time basis for the workout. In some embodiments the intermediate computing device 218 performs some processing of the strike information collated by the accessory 10.

Figure 27:
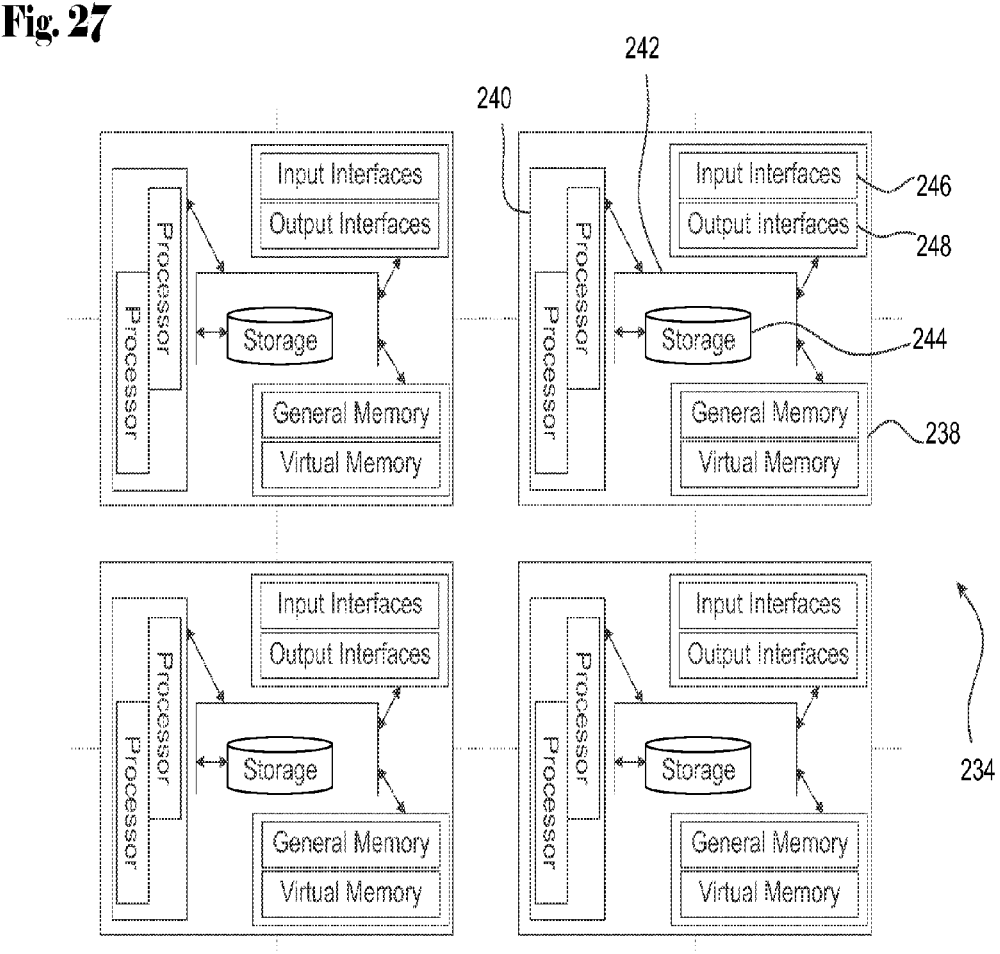
FIG. 27 provides a schematic view of a computer system according to yet a further preferred embodiment of the present invention.

Referring to FIG. 27 there is shown a schematic diagram of a computer system 234 that is configured to provide at least a portion of preferred arrangements of systems and methods described herein. The computer system 234 is provided as a distributed computer environment containing a number of individual computer systems 236 (computers/computing devices) that cooperate to provide the preferred arrangements. In other embodiments the computer system 234 is provided as a single computer or another computing device.

As shown, a first one of the computing devices 236 includes a memory facility 238. The memory facility 238 includes both 'general memory' and other forms of memory such as virtual memory. The memory facility 218 is operatively connected to a processing facility 240 including at least one processor. The memory facility 238 includes computer information in the form of executable instructions and/or computer data. The memory facility 238 is accessible by the processing facility 240 in implementing the preferred arrangements.

As shown each of the computing devices 236 includes a system bus facility 242, a data store facility 244, an input interface facility 246 and an output interface facility 248. The data store facility 244 includes computer information in form of executable instructions and/or computer data. The data store facility 244 is operatively connected to the processing facility 240. The data store facility 244 is operatively connected to the memory facility 238. The data store facility 244 is accessible by the processing facility 240 in implementing the preferred arrangements.

Computer information may be located across a number of devices and be provided in a number of forms. For example the data store facility 244 may include computer information in the form of executable instructions and/or computer data. The computer data information may be provided in the form of encoded data instructions, data signals, data structures, program logic for server side operation, program logic for client side operation, stored webpages and so forth that are accessible by the processing facility 240.

On one level, input interfaces allow computer data to be received by the computing devices 236. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 246, 248 provide input and output interfaces that are operatively associated with the processing facility 240. The input and output facilities 246, 248 allow for communication between the computing devices 236 and individuals.

The computing devices 236 provide a distributed system in which several devices are in communication over network and other interfaces to collectively provide the preferred arrangements. Preferably there is provided at least one client device in the system of computing devices 236 where the system is interconnected by a data network.

The client device may be provided with a client side software product for use in the system which, when used, provides systems and methods where the client device and other computer devices 236 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions they preferably encode the systems, components and facilities described herein. For example a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements. The computer readable medium is preferably operatively associated with computer based transmission facilities for the transfer of computer data. Computer readable mediums may provide data signals.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms arrangement. Methods will be apparent from systems described herein and systems will be apparent from methods described herein.

It is to be recognised that various alterations and equivalent forms may be provided without departing from the spirit and scope of the present invention. This includes modifications within the scope of the appended claims along with all modifications, alternative constructions and equivalents. There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

The claims defining the invention are as follows:

1. A strike measurement device, comprising:
   a body adapted to be wrapped around a boxing, kickboxing or martial arts punching bag, the body including a number of sensors configured to detect strikes and to output strike force data indicative of the strikes; and
   one or more gripping portions provided on a rear surface of the body for gripping the punching bag;
   wherein the body has a width such that a single device, when positioned on the punching bag, is of sufficient circumferential extent for measuring the performance of a selected one from the group comprising leg directed strikes, torso directed strikes and head directed strikes to a front surface of the body; wherein the device has a height equal to less than a third of a height of the punching bag such that a plurality of the devices is required to be positioned on the punching bag to concurrently measure the performance of leg, torso, and head directed strikes to the front surface of the body; and
   wherein the body is: i) positionable at a lower position on the punching bag and configured to measure and categorise, left, right and central leg strikes; ii) positionable at a middle position on the punching bag and configured to measure and categorise left, right and central torso strikes; or iii) positionable at an upper position on the punching bag and configured to measure and categorise left, right and central head strikes.

2. A device as claimed in claim 1, wherein at least three of the devices are required to be positioned on the punching bag to concurrently measure the performance of leg, torso and head directed strikes to the front surface of the body.

3. A device as claimed in claim 2, including a computing device to concurrently measure strike information from the at least three devices.

4. A device as claimed in claim 1, including three groupings of sensors to respectively measure left, central and right strikes.

5. A device as claimed in claim 1, including at least two spaced apart fastening portions of length at least one quarter of the circumference of the punching bag.

6. A device as claimed in claim 5, wherein the fastening portions comprise Velcro strips.

7. A device as claimed in claim 1, wherein a user can assess his or her performance in overall power, speed, and accuracy of strikes.

8. A device as claimed in claim 1, wherein the gripping portions comprise strips of a rubber material.

9. A device as claimed in claim 1, including at least two spaced apart fastening portions, wherein the gripping portions are positioned underneath the at least two spaced apart fastening portions.

10. A marital arts strike measurement system, comprising:
    a strike measurement device, comprising:
      a body adapted to be wrapped around a boxing, kickboxing or martial arts punching bag, the body including a number of sensors configured to detect strikes and to output strike force data indicative of the strikes; and
      one or more gripping portions provided on a rear surface of the body for gripping the punching bag;
      wherein the body has a width such that a single device, when positioned on the punching bag, is of sufficient circumferential extent for measuring the performance of a selected one from the group comprising leg directed strikes, torso directed strikes and head directed strikes to a front surface of the body; wherein the strike measurement device has a height equal to less than a third of a height of the punching bag such that a plurality of the devices is required to be positioned on the punching bag to concurrently measure the performance of leg, torso, and head directed strikes to the front surface of the body; and
    a communications facility for use in receiving the strike force data from the sensors and transmitting strike information to a computing device;
    wherein the system is adapted for utilising an intermediate computing device between the computing device and the communications facility, the intermediate computing device for assisting with the transmission of the strike information to the computing device.

11. A strike measurement system as claimed in claim 10, wherein the system is adapted for utilising the intermediate computing device between the computing device and the communications facility for assisting with the transmission of the strike information to the computing device on a substantially real-time basis.

12. A strike measurement system as claimed in claim 11, including an application for providing computer instructions for causing the computing device to query the intermediate computing device on a substantially real-time basis.

13. A strike measurement system as claimed in claim 12, wherein computer instructions are provided for causing the computing device to query the intermediate computing device at regular intervals.

14. A strike measurement system as claimed in claim 12, wherein the intermediate computing device is a smart phone.

15. A strike measurement system as claimed in claim 10, wherein the intermediate computing device is adapted to communicate wirelessly with the communications facility and with the computing device.

16. A strike measurement device, comprising:
    a body adapted to be wrapped around a boxing, kickboxing or martial arts punching bag, the body including a number of sensors configured to detect strikes and to output strike force data indicative of the strikes; and
    one or more gripping portions provided on a rear surface of the body for gripping the punching bag;
    wherein the body has a width such that a single device, when positioned on the punching bag, is of sufficient circumferential extent for measuring the performance of a selected one from the group comprising leg directed strikes, torso directed strikes and head directed strikes to a front surface of the body; and wherein the device has a height equal to less than a third of a height of the punching bag such that at least three of the devices are required to be positioned on the punching bag to concurrently measure the performance of leg, torso, and head directed strikes to the front surface of the body, and the device includes a computing device to concurrently measure strike information from the at least three devices.

* * * * *